(12) United States Patent
Kawasaki et al.

(10) Patent No.: US 9,970,074 B2
(45) Date of Patent: May 15, 2018

(54) COLD-ROLLED STEEL SHEET, GALVANIZED COLD-ROLLED STEEL SHEET AND METHOD OF MANUFACTURING THE SAME

(71) Applicant: NIPPON STEEL & SUMITOMO METAL CORPORATION, Tokyo (JP)

(72) Inventors: Kaoru Kawasaki, Tokyo (JP); Masaharu Kameda, Tokyo (JP); Kohichi Sano, Tokyo (JP); Riki Okamoto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 247 days.

(21) Appl. No.: 14/891,889

(22) PCT Filed: Jul. 1, 2014

(86) PCT No.: PCT/JP2014/067532
§ 371 (c)(1),
(2) Date: Nov. 17, 2015

(87) PCT Pub. No.: WO2015/002190
PCT Pub. Date: Jan. 8, 2015

(65) Prior Publication Data
US 2016/0130680 A1    May 12, 2016

(30) Foreign Application Priority Data

Jul. 1, 2013   (JP) ................................ 2013-138313
Mar. 28, 2014  (JP) ................................ 2014-070351

(51) Int. Cl.
| | |
|---|---|
| *C22C 38/02* | (2006.01) |
| *C22C 38/04* | (2006.01) |
| *C22C 38/06* | (2006.01) |
| *C22C 38/22* | (2006.01) |
| *C21D 8/04* | (2006.01) |
| *C21D 9/46* | (2006.01) |
| *C23C 2/06* | (2006.01) |
| *C23C 2/28* | (2006.01) |
| *C23C 2/40* | (2006.01) |
| *C22C 38/54* | (2006.01) |
| *C22C 38/12* | (2006.01) |
| *C21D 8/02* | (2006.01) |
| *B32B 15/01* | (2006.01) |
| *C21D 6/00* | (2006.01) |
| *C22C 38/00* | (2006.01) |
| *C22C 38/08* | (2006.01) |

(Continued)

(52) U.S. Cl.
CPC .............. *C21D 9/46* (2013.01); *B32B 15/013* (2013.01); *C21D 6/004* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0247* (2013.01); *C21D 8/0426* (2013.01); *C21D 8/0436* (2013.01); *C21D 8/0447* (2013.01); *C21D 8/0473* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/22* (2013.01); *C22C 38/26* (2013.01); *C22C 38/28* (2013.01); *C22C 38/32* (2013.01); *C22C 38/42* (2013.01); *C22C 38/44* (2013.01); *C22C 38/54* (2013.01); *C23C 2/06* (2013.01); *C23C 2/28* (2013.01); *C23C 2/40* (2013.01); *C21D 2201/05* (2013.01); *C21D 2211/001* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | |
|---|---|---|
| 6,375,765 B1 | 4/2002 | Takahashi et al. |
| 2003/0196735 A1 | 10/2003 | Sugiura et al. |

(Continued)

FOREIGN PATENT DOCUMENTS

| | | |
|---|---|---|
| EP | 0707087 A1 | 4/1996 |
| JP | 2000-290745 A | 2/2000 |

(Continued)

OTHER PUBLICATIONS

International Search Report, issued in PCT/JP2014/067532, dated Sep. 16, 2014.
Office Action, issued in TW 103122683, dated May 18, 2015.
Written Opinion of the International Searching Authority, issued in PCT/JP2014/067532, dated Sep. 16, 2014.
International Preliminary Report on Patentability and English translation of the Written Opinion of the International Searching Authority (PCT/IB/338, PCT/IB/373 and PCT/ISA/237) dated Jan. 14, 2016 for Application No. PCT/JP2014/067532.
Extended European Search Report, dated Feb. 9, 2017, for corresponding European Application No. 14819768.4.

*Primary Examiner* — Deborah Yee
(74) *Attorney, Agent, or Firm* — Birch, Stewart, Kolasch & Birch, LLP

(57) ABSTRACT

A cold-rolled steel sheet includes a predetermined chemical composition, and includes a structure expressed by: an area fraction of ferrite: 95% or more; an area fraction of retained austenite and an area fraction of martensite: 1% to 3% in total; a product of the area fraction of retained austenite and a carbon concentration in retained austenite: 1 or more; a value of $I(111)/\{I(100)+I(110)\}$ at a region where a depth from a surface is ¼ of a thickness of the cold-rolled steel sheet when intensity of a (hkl) plane is expressed by $I(hkl)$: 2 or less.

14 Claims, No Drawings

(51) Int. Cl.
*C22C 38/10* (2006.01)
*C22C 38/14* (2006.01)
*C22C 38/16* (2006.01)
*C22C 38/26* (2006.01)
*C22C 38/28* (2006.01)
*C22C 38/32* (2006.01)
*C22C 38/42* (2006.01)
*C22C 38/44* (2006.01)

(56) References Cited

U.S. PATENT DOCUMENTS

| 2007/0095444 A1 | 5/2007 | Nonaka et al. |
| 2011/0186185 A1 | 8/2011 | Nonaka et al. |
| 2013/0192724 A1 | 8/2013 | Tanaka et al. |
| 2013/0295410 A1 | 11/2013 | Takahashi et al. |
| 2014/0044989 A1 | 2/2014 | Toda et al. |

FOREIGN PATENT DOCUMENTS

| JP | 2001-355041 A | 12/2001 |
| JP | 2002-115025 A | 4/2002 |
| JP | 2002-317246 A | 10/2002 |
| JP | 2005-8961 A | 1/2005 |
| JP | 2007-162078 A | 6/2007 |
| JP | 2009-249676 A | 10/2009 |
| JP | 2012-117148 A | 6/2012 |
| WO | WO 00/06791 A1 | 2/2000 |
| WO | WO 2011/148490 A1 | 12/2011 |
| WO | WO 2012/144567 A1 | 10/2012 |

COLD-ROLLED STEEL SHEET, GALVANIZED COLD-ROLLED STEEL SHEET AND METHOD OF MANUFACTURING THE SAME

TECHNICAL FIELD

The present invention relates to a cold-rolled steel sheet and a galvanized cold-rolled steel sheet excellent in press formability, and a method of manufacturing the same.

BACKGROUND ART

Various steel sheets are used for a vehicle, and a steel sheet with strength over 980 MPa is used for framework components. This is to enable reduction in weight of a vehicle body to improve mileage of a vehicle while securing collision safety. Improvement in strength is required also for a steel sheet for panel components to enable both the reduction in weight of the vehicle body and the collision safety, and press formability is very important for the steel sheet for panel components depending on usage thereof.

For example, an ultralow carbon steel sheet where Ti and Nb are added is used for outer plate components where the press formability is required, and in particular, a BH (bake hardening) steel sheet is used for an outer plate panel of a door to supply a dent resistance property. Further, a steel sheet with a low yield strength is used from a viewpoint of avoiding a plane defect called as a surface strain, which occurs in press forming. As stated above, high strength as same as the framework component is not required and high ductility as same as a mild steel sheet is required due to restrictions such as the surface strain generated in press forming as for the steel sheet used for a complicated shaped component such as an inner plate or the outer plate component even for the steel sheet for the panel component.

A TRIP (transformation-induced plasticity) steel sheet where a transformation-induced plasticity effect is used is known as a steel sheet including ductility and high-strength. For example, a high-strength hot-dip galvanized steel sheet for outer plate and a method of manufacturing the same are disclosed in Patent Literature 1.

However, it is difficult for a conventional TRIP steel sheet including a steel sheet disclosed in Patent Literature 1 to obtain more excellent ductility and hole expandability while obtaining strength of 380 MPa to 630 MPa, which is suitable for a panel component. Various steel sheets are also disclosed in Patent Literatures 2 to 5, but it is difficult to obtain the more excellent ductility and hole expandability while obtaining the strength of 380 MPa to 630 MPa.

CITATION LIST

Patent Literature

Patent Literature 1: Japanese Laid-open Patent Publication No. 2012-117148
Patent Literature 2: Japanese Laid-open Patent Publication No. 2005-8961
Patent Literature 3: International Publication No. 2011/148490
Patent Literature 4: Japanese Laid-open Patent Publication No. 2000-290745
Patent Literature 5: Japanese Laid-open Patent Publication No. 2009-249676

SUMMARY OF INVENTION

Technical Problem

An object of the present invention is to provide a cold-rolled steel sheet and a galvanized cold-rolled steel sheet capable of obtaining excellent ductility and hole expandability while having appropriate strength, and a method of manufacturing the same.

Solution to Problem

The present inventors came up to various modes of the invention described below by the repeated various hard studies for solving the problems.

(1)
A cold-rolled steel sheet, including:
a chemical composition expressed by, in mass %:
Si: 0.01% to 0.50%;
Mn or Cr, or both thereof: 0.70% to 1.50% in total;
C: 0.030% to 0.060% when Cr: "0" (zero) % or more and less than 0.30%,
  0.030% to 0.080% when Cr: 0.30% or more and 1.50% or less;
Al: 0.800% to 2.000%;
P: 0.030% or less;
S: 0.0100% or less;
Mo: 0.10% to 0.50%;
O: 0.0070% or less;
N: 0.0070% or less;
B: "0" (zero) % to 0.0020%;
Ti: "0" (zero) % to 0.050%;
Nb: "0" (zero) % to 0.050%;
V: "0" (zero) % to 0.050%;
Ni: "0" (zero) % to 1.00%;
Cu: "0" (zero) % to 1.00%;
Ca or REM, or both thereof: "0" (zero) % to 0.0300% in total;
W: "0" (zero) % to 1.000%;
Mg: "0" (zero) % to 0.010%;
Zr: "0" (zero) % to 0.200%;
As: "0" (zero) % to 0.500%;
Co: "0" (zero) % to 1.000%;
Sn: "0" (zero) % to 0.200%;
Pb: "0" (zero) % to 0.200%;
Y: "0" (zero) % to 0.200%;
Hf: "0" (zero) % to 0.2000%; and
the balance: Fe and impurities; and a structure expressed by:
an area fraction of ferrite: 95% or more;
an area fraction of retained austenite and an area fraction of martensite: 1% to 3% in total;
a product of the area fraction of retained austenite and a carbon concentration in retained austenite: 1 or more;
a value of $I(111)/\{I(100)+I(110)\}$ at a region where a depth from a surface is ¼ of a thickness of the cold-rolled steel sheet when intensity of a (hkl) plane is expressed by $I(hkl)$: 2 or less.

(2)
The cold-rolled steel sheet according to (1), wherein the chemical composition satisfies:
Cr: 0.30% to 0.80%; or
Mn: 0.40% to 1.00%; or
both thereof.

(3)
The cold-rolled steel sheet according to (1) or (2), wherein the chemical composition satisfies:

B: 0.0003% to 0.0020%;
Ti: 0.005% to 0.050%;
Nb: 0.005% to 0.050%; or
V: 0.005% to 0.050%; or
any combination thereof.

(4)

The cold-rolled steel sheet according to any one of (1) to (3), wherein the chemical composition satisfies:
Ni: 0.01% to 1.00%; or
Cu: 0.01% to 1.00%; or both thereof.

(5)

The cold-rolled steel sheet according to any one of (1) to (4), wherein the chemical composition satisfies
Ca or REM, or both thereof: 0.0005% to 0.0300% in total.

(6)

The cold-rolled steel sheet according to any one of (1) to (5), wherein the chemical composition satisfies:
W: 0.001% to 1.000%;
Mg: 0.0001% to 0.010%;
Zr: 0.0001% to 0.200%;
As: 0.0001% to 0.500%;
Co: 0.0001% to 1.000%;
Sn: 0.0001% to 0.200%;
Pb: 0.0001% to 0.200%;
Y: 0.0001% to 0.200%; or
Hf: 0.0001% to 0.2000%; or
any combination thereof.

(7)

A galvanized cold-rolled steel sheet, including:
the cold-rolled steel sheet according to any one of (1) to (6); and
a hot-dip galvanized layer or an alloyed hot-dip galvanized layer on a surface of the cold-rolled steel sheet.

(8)

A method of manufacturing a cold-rolled
performing hot-rolling of a slab heated to a temperature of 1250° C. or less to obtain a hot-rolled sheet;
coiling the hot-rolled sheet at a temperature of 650° C. or less;
then, performing cold-rolling of the hot-rolled sheet with a reduction ratio of 70% or more to obtain a cold-rolled sheet; and
performing continuous annealing of the cold-rolled sheet at a temperature of 750° C. to 900° C.,
wherein
the performing the hot-rolling includes performing finish-rolling at a temperature of 850° C. to 1000° C. under a state in which two phases of ferrite and austenite exist,
a total reduction ratio at last three stands is 60% or more in the finish-rolling,
cooling is started within one second from an end of the finish-rolling, and
the slab includes a chemical composition expressed by, in mass %,
Si: 0.01% to 0.50%;
Mn or Cr, or both thereof: 0.70% to 1.50% in total;
C: 0.030% to 0.060% when Cr: "0" (zero) % or more and less than 0.30%,
  0.030% to 0.080% when Cr: 0.30% or more and 1.50% or less;
Al: 0.800% to 2.000%;
P: 0.030% or less;
S: 0.0100% or less;
Mo: 0.10% to 0.50%;
O: 0.0070% or less;
N: 0.0070% or less;
B: "0" (zero) % to 0.0020%;
Ti: "0" (zero) % to 0.050%;
Nb: "0" (zero) % to 0.050%;
V: "0" (zero) % to 0.050%;
Ni: "0" (zero) % to 1.00%;
Cu: "0" (zero) % to 1.00%;
Ca or REM, or both of them: "0" (zero) % to 0.0300% in total;
W: "0" (zero) % to 1.000%;
Mg: "0" (zero) % to 0.010%;
Zr: "0" (zero) % to 0.200%;
As: "0" (zero) % to 0.500%;
Co: "0" (zero) % to 1.000%;
Sn: "0" (zero) % to 0.200%;
Pb: "0" (zero) % to 0.200%;
Y: "0" (zero) % to 0.200%;
Hf: "0" (zero) % to 0.2000%; and
the balance: Fe and impurities.

(9)

The method of manufacturing the cold-rolled steel sheet according to (8), wherein in the chemical composition satisfies:
Cr: 0.30% to 0.80%; or
Mn: 0.40% to 1.00%; or
both thereof.

(10)

The method of manufacturing the cold-rolled steel sheet according to (8) or (9), wherein the chemical composition satisfies:
B: 0.0003% to 0.0020%;
Ti: 0.005% to 0.050%;
Nb: 0.005% to 0.050%; or
V: 0.005% to 0.050%; or
any combination thereof.

(11)

The method of manufacturing the cold-rolled steel sheet according to any one of (8) to (10), wherein the chemical composition satisfies:
Ni: 0.01% to 1.00%; or
Cu: 0.01% to 1.00%; or
both thereof.

(12)

The method of manufacturing the cold-rolled steel sheet according to any one of (8) to (11), wherein the chemical composition satisfies
Ca or REM, or both thereof: 0.0005% to 0.0300% in total.

(13)

The method of manufacturing the cold-rolled steel sheet according to any one of (8) to (12), wherein the chemical composition satisfies:
W: 0.001% to 1.000%;
Mg: 0.0001% to 0.010%;
Zr: 0.0001% to 0.200%;
As: 0.0001% to 0.500%;
Co: 0.0001% to 1.000%;
Sn: 0.0001% to 0.200%;
Pb: 0.0001% to 0.200%;
Y: 0.0001% to 0.200%; or
Hf: 0.0001% to 0.2000%; or
any combination thereof.

(14)

A method of manufacturing a galvanized cold-rolled steel sheet, including:
manufacturing a cold-rolled steel sheet by the method according to any one of (8) to (13); and forming a hot-dip galvanized layer or an alloyed hot-dip galvanized layer on a surface of the cold-rolled steel sheet.

Advantageous Effects of Invention

According to the present invention, it is possible to obtain excellent ductility and hole expandability while having an appropriate strength. Besides, improvement in deep drawability can be expected owing to a TRIP effect.

DESCRIPTION OF EMBODIMENTS

Hereinafter, embodiments of the present invention are described.

First, a structure of a cold-rolled steel sheet according to the embodiment is described. The cold-rolled steel sheet according to the embodiment includes a structure expressed by: an area fraction of ferrite ($V_F$): 95% or more, an area fraction of retained austenite ($V_{\gamma R}$) and an area fraction of martensite ($V_M$): 1% to 3% in total, a product of the area fraction of retained austenite ($V_{\gamma R}$) and a carbon concentration in retained austenite ($C_{\gamma R}$): 1 or more, a value of $I(111)/\{I(100)+I(110)\}$ at a region where a depth from a surface is ¼ of a thickness of the cold-rolled steel sheet when intensity of a (hkl) plane is expressed by I(hkl): 2 or less.

(Area Fraction of Ferrite ($V_F$ (%))): 95% or More)

Ferrite exhibits excellent deformability, and improves ductility. When the area fraction of ferrite is less than 95%, sufficient ductility cannot be obtained. Accordingly, the area fraction of ferrite is 95% or more.

(Area Fraction of Retained Austenite ($V_{\gamma R}$ (%)) and Area Fraction of Martensite ($V_M$ (%)): 1% to 3% in Total)

Retained austenite and martensite contribute to secure strength. When a sum of the area fraction of retained austenite and the area fraction of martensite is less than 1%, sufficient strength cannot be obtained. When the sum of the area fraction of retained austenite and the area fraction of martensite is over 3%, sufficient hole expandability cannot be obtained. Therefore, the area fraction of retained austenite and the area fraction of martensite are 1% to 3% in total.

(Product of Area Fraction of Retained Austenite ($V_{\gamma R}$ (%)) and Carbon Concentration in Retained Austenite ($C_{\gamma R}$ (Mass %)): 1 or More)

Characteristics of retained austenite are largely affected by the carbon concentration in the retained austenite itself. When the product of the area fraction of retained austenite and the carbon concentration in retained austenite ($V_{\gamma R} \times C_{\gamma R}$) is less than 1, the sufficient ductility, for example, elongation of 40% or more cannot be obtained. Accordingly, the product of the area fraction of retained austenite and the carbon concentration in retained austenite is 1 or more.

(Value of $I(111)/\{I(100)+I(110)\}$ at Region where Depth from Surface is ¼ of Thickness of Cold-Rolled Steel Sheet: 2 or Less)

The value of $I(111)/\{I(100)+I(110)\}$, namely, a plane intensity ratio is reflected by a form of a texture of ferrite. When the plane intensity ratio at the region where the depth from the surface is ¼ of the thickness of the cold-rolled steel sheet (sheet thickness ¼t part) is over 2, in-plane anisotropy is too large, and therefore, the sufficient hole expandability cannot be obtained. The plane intensity ratio at the sheet thickness ¼t part is preferably 1 or less. Intensity of an (hkl) plane (I(hkl)) may be obtained by an electron backscattered diffraction pattern (EBSD) method using a field emission scanning electron microscope (FESEM) or an X-ray diffractometry. Namely, it is possible to grasp the characteristics of the texture of ferrite with the FESEM-EBSD method or the X-ray diffractometry. Intensity of a (111) plane, intensity of a (100) plane, and intensity of a (110) plane were found by the FESEM-EBSD method in examples described later.

Identification of ferrite, retained austenite, martensite, and bainite, confirmation of positions thereof, and measurement of area fractions thereof may be performed by observing a cross section in parallel with the rolling direction and the thickness direction, or a cross section orthogonal to the rolling direction. Observation of a cross-section may be performed by, for example, etching the cross-section with a Nital reagent, and observing it at a magnification of 1000 times to 100000 times with a scanning electron microscope (SEM) or a transmission electron microscope (TEM). Other etchants may be used instated of the Nital reagent. An example of usable etchant is described in Japanese Laid-open Patent Publication No. 59-219473. The etchant described in Japanese Laid-open Patent Publication No. 59-219473 is "a color etching solution characterized by consisting of a pretreatment solution and a post-treatment solution, in which the pretreatment solution is prepared by mixing a solution A in which 1 to 5 g of picric acid is dissolved into 100 mL of ethanol, with a solution B in which 1 to 25 g of sodium thiosulfate and 1 to 5 g of citric acid are dissolved into 100 mL of water, in a proportion of 1:1, and thereafter adding 1.5 to 4% of nitric acid to the solution, and the post-treatment solution is prepared by mixing 10% of the pretreating solution with a 2% Nital solution, or mixing 2 to 5% of nitric acid with 100 ml of ethanol." Crystal orientation analysis may also be performed by the EBSD method using FESEM to identify structures, confirm positions thereof, and measure area fractions thereof.

The area fraction of martensite ($V_M$), the area fraction of ferrite ($V_F$), the area fraction of retained austenite ($V_{\gamma R}$), and the area fraction of bainite ($V_B$) may also be measured as described below. For example, a sample is taken which has a cross-section in parallel with the rolling direction and the thickness direction of a steel sheet as an observation surface, the observation surface is electropolished, a portion of the steel sheet at a depth of ⅛ to ⅜ thickness thereof from the surface is observed with an FESEM, and the area fraction is measured by the EBSD method. In such an occasion, each measurement is performed at a magnification of 5000 times in 10 visual fields, the area fraction is assumed to be an average value thereof. "OIM-Analysis 5" manufactured by TSL solutions Co., Ltd. may be used for the analysis.

Effects of the embodiment may be obtained, even if bainite and pearlite are contained as long as a sum of area fractions of these is less than 1%.

The carbon concentration ($C_{\gamma R}$) in retained austenite may be specified as described below. First, a lattice constant is found from a midpoint of full width at half maximum of a plane intensity as for each of a (200) plane, a (220) plane, and a (311) plane of retained austenite by the X-ray diffraction whose target is Fe. An average value of these lattice constants is defined as a lattice constant ($a_0$) of austenite, and the carbon concentration ($C_{\gamma R}$) is calculated from the following expression 1. In the expression 1, "% Al" is an Al content of the cold-rolled steel sheet, and a coefficient (0.0087) thereof is a value found from Table 1 in a document (C. M. Chu et. al.: Scr. Metal. et Mater., Vol. 30, p. 505-508) by the multiple regression.

$$a_0 = 3.572 + 0.033 \times (C_{\gamma R}) + 0.0087 \times (\% \text{ Al}) \quad \text{(expression 1)}$$

When these conditions are satisfied, amounts of retained austenite and martensite which are adjacent to bainite are extremely small, and the excellent ductility and hole expandability can be obtained. Besides, a quotient ($V_B/V_{\gamma R}$) where the area fraction of bainite ($V_B$) is divided by the area fraction of retained austenite ($V_{\gamma R}$) is 0.6 or less. Reasons why the excellent ductility and hole expandability can be obtained when the amounts of retained austenite and martensite which are adjacent to bainite are extremely small is not known, but it is supposed to be as follows. In general, formability is more improved owing to ferrite, which is easy to be deformed, existing around retained austenite or martensite. When the amount of bainite around retained austenite is small, a shape of retained austenite is like a sphere, and therefore, concentration of distortion is difficult to occur, and retained austenite remains up to a latter stage even if working such as press forming is performed. Accordingly, the effect of the TRIP is kept, and the excellent ductility and hole expandability are obtained. A sum (f_N) of the area fraction of retained austenite and the area fraction of martensite which are adjacent to bainite is preferable to be as smaller as possible. The sum (f_N) of the area fractions is preferably three out of ten or less relative to the sum of the area fraction of martensite and the area fraction of retained austenite, and more preferably two out of ten or less.

Next, a chemical composition of the cold-rolled steel sheet according to the embodiment of the present invention and a slab used for manufacturing the same is described. Details will be described later, but the cold-rolled steel sheet according to the embodiment of the present invention is manufactured through hot-rolling of the slab, cooling, coiling, cold-rolling, continuous annealing, and so on. Accordingly, the chemical composition of the cold-rolled steel sheet and the slab are ones in consideration of not only characteristics of the cold-rolled steel sheet but also the above-stated processes. In the following description, "%" being a unit of a content of each element contained in the cold-rolled steel sheet and the slab used for the manufacturing the same means "mass %" unless otherwise specified. The cold-rolled steel sheet according to the embodiment and the slab used for the manufacturing the same each include a chemical composition expressed by: Si: 0.01% to 0.50%; Mn or Cr, or both thereof: 0.70% to 1.50% in total; C: 0.030% to 0.060% when Cr: "0" (zero) % or more and less than 0.30%, 0.030% to 0.080% when Cr: 0.30% or more and 1.50% or less; Al: 0.800% to 2.000%; P: 0.030% or less; S: 0.0100% or less; Mo: 0.10% to 0.50%; O: 0.0070% or less; N: 0.0070% or less; B: "0" (zero) % to 0.0020%; Ti: "0" (zero) % to 0.050%; Nb: "0" (zero) % to 0.050%; V: "0" (zero) % to 0.050%; Ni: "0" (zero) % to 1.00%; Cu: "0" (zero) % to 1.00%; Ca or REM, or both thereof: "0" (zero) % to 0.0300% in total; W: "0" (zero) % to 1.000%; Mg: "0" (zero) % to 0.010%; Zr: "0" (zero) % to 0.200%; As: "0" (zero) % to 0.500%; Co: "0" (zero) % to 1.000%; Sn: "0" (zero) % to 0.200%; Pb: "0" (zero) % to 0.200%; Y: "0" (zero) % to 0.200%; Hf: "0" (zero) % to 0.2000%; and the balance: Fe and impurities. As the impurities, those contained in raw materials such as ores and scraps, and those introduced in the production process are exemplified.

(Si: 0.01% to 0.50%)

Si contributes to improve the strength of the cold-rolled steel sheet, and stabilizes retained austenite by suppressing precipitation of cementite. When a Si content is less than 0.01%, these effects cannot be sufficiently obtained. Therefore, the Si content is 0.01% or more. Significant cost is sometimes required to reduce the Si content. When the Si content is over 0.50%, the strength is too high due to solid solution strengthening, and sufficient press formability cannot be obtained. Accordingly, the Si content is 0.50% or less, and preferably 0.10% or less. When the Si content is excessive, sufficient plating wettability cannot be sometimes obtained in forming a hot-dip galvanized layer.

(Mn or Cr, or Both Thereof: 0.70% to 1.50% in Total)

Mn and Cr secure hardenability, and contribute to secure an appropriate amount of retained austenite. When a sum of a Mn content and a Cr content is less than 0.70%, ferrite and pearlite are excessively formed, and a desired area fraction of retained austenite cannot be obtained. Thus, the sum of the Mn content and the Cr content is 0.70% or more. When the sum of the Mn content and the Cr content is over 1.50%, the strength is too high, and the sufficient press formability cannot be obtained. Troubles such that a casted slab cracks are easy to occur due to embrittlement caused by segregation of Mn and/or Cr. Weldability is sometimes lowered. Strength of a hot-rolled sheet is sometimes excessively high, and it may be difficult to secure a high reduction ratio in cold-rolling. Therefore, the sum of the Mn content and the Cr content is 1.50% or less. When the sum of the Mn content and the Cr content is 0.70% to 1.50%, there is no problem if one of Mn and Cr is not contained.

The Cr content is preferably 0.30% to 0.80%, and the Mn content is preferably 0.40% to 1.00%. Cr of 0.30% or more and Mn of 0.40% or more contribute to further improve the hardenability. When the Cr content is over 0.80% or the Mn content is over 1.00%, the embrittlement caused by segregation may be easy to occur, and cold-rollability may be sometimes lowered because the strength of the hot-rolled sheet is high. As it is described later, when the Cr content is less than 0.30%, the sufficient press formability cannot be obtained when a C content is over 0.060%, but the sufficient press formability may be obtained when the Cr content is 0.30% or more even if the C content is over 0.060%.

(C: 0.030% to 0.060% (when Cr: "0" (Zero) % or More and Less than 0.30%), or 0.030% to 0.080% (when Cr: 0.30% or More and 1.50% or Less))

C contributes to improve the strength of the cold-rolled steel sheet, and stabilizes retained austenite. When the C content is less than 0.030%, these effects cannot be sufficiently obtained. Accordingly, the C content is 0.030% or more, and preferably 0.040% or more. When the C content is over 0.060% in a case where the Cr content is "0" (zero) % or more and less than 0.30%, the strength is too high, and the sufficient press formability cannot be obtained. Therefore, the C content is 0.060% or less, preferably 0.050% or less in the case where the Cr content is "0" (zero) % or more and less than 0.30%. On the other hand, when the C content is 0.080% or less, a sufficient press formability can be obtained even when the C content is over 0.060% in a case where the Cr content is 0.30% or more and 1.50% or less. Therefore, the C content is 0.080% or less, preferably 0.060% or less in the case where the Cr content is 0.30% or more and 1.50% or less. Reasons why the sufficient press formability can be obtained even when the C content is over 0.060% is not known, but it is supposed that carbide remains without being dissolved in annealing due to a function of Cr, generations of hard structures such as retained austenite and martensite are suppressed, and excessive increase in the strength is suppressed. Besides, a fact that solid-solution hardenability of Cr is lower than that of Mn is also supposed to be a cause that the sufficient press formability can be obtained.

(Al: 0.800% to 2.000%)

Al has a function deoxidizing molten steel, stabilizes retained austenite, and contributes to secure high ductility. When an Al content is less than 0.800%, sufficient ductility cannot be obtained. Therefore, the Al content is 0.800% or more. When the Al content is over 2.000%, a lot of oxide remains in the cold-rolled steel sheet, and mechanical properties, in particular, local deformability may deteriorate, and variation of characteristics may be large. The effect to stabilize retained austenite is saturated when the Al content is over 2.000%. Therefore, the Al content is 2.000% or less. The Al content is preferably 1.700% or less from a viewpoint of avoiding nozzle clogging or the like in casting.

(P: 0.030% or Less)

P is not an essential element, and is contained, for example, as an impurity in the steel. P is easy to segregate to a center part in the thickness direction of the steel sheet, and embrittles a welded part. The segregation of P leads to lower the hole expandability. Accordingly, the lower a P content is, the better. In particular, the lowering of the hole expandability and the embrittlement of the welded part are remarkable when the P content is over 0.030%. Therefore, the P content is 0.030% or less. Significant cost may be required to make the P content to be less than 0.001%. It takes cost to reduce the P content, and the cost remarkably increases to reduce to be less than 0.001%. Accordingly, the P content may be 0.001% or more.

(S: 0.0100% or Less)

S is not an essential element, and is contained, for example, as an impurity in the steel. Manufacturability in casting and manufacturability in hot-rolling are lowered as an S content is higher. Therefore, the lower the S content is, the better. In particular, the lowering of the manufacturability is remarkable when the S content is over 0.0100%. Accordingly, the S content is 0.0100% or less. It takes cost to reduce the S content, and the cost remarkably increases to reduce to less than 0.0001%. Therefore, the S content may be 0.0001% or more.

(Mo: 0.10% to 0.50%)

Mo contributes to secure retained austenite, in particular, to secure retained austenite when a hot-dip galvanizing treatment is performed. When a Mo content is less than 0.10%, this effect cannot be sufficiently obtained. Accordingly, the Mo content is 0.10% or more. When the Mo content is over 0.50%, this effect is saturated, and the cost just increases. Besides, the effect to stabilize retained austenite is saturated when the Mo content is over 0.50%. Therefore, the Mo content is 0.50% or less, and preferably 0.30% or less from a viewpoint of cost.

(O: 0.0070% or Less)

O is not an essential element, and is contained, for example, as an impurity in the steel. O forms oxide, and deteriorates the hole expandability. Besides, the oxide existing in a vicinity of a surface of the cold-rolled steel sheet may be a cause of a surface flaw, and deteriorates an appearance grade. When the oxide exists at a cut surface, a flaw in a cutout state is formed at the cut surface, and the hole expandability deteriorates. Therefore, the lower an O content is, the better. In particular, the deterioration of the hole expandability or the like is remarkable when the O content is over 0.0070%. Therefore, the O content is 0.0070% or less. It takes cost to reduce the O content, and the cost remarkably increases to reduce to less than 0.0001%. Therefore, the O content may be 0.0001% or more.

(N: 0.0070% or Less)

N is not an essential element, and is contained, for example, as an impurity in the steel. N forms coarse nitride, and deteriorates the ductility and the hole expandability. N may be a cause of occurrence of blowholes in welding. Therefore, the lower an N content is, the better. In particular, the deteriorations or the like of bendability, the hole expandability are remarkable when the N content is over 0.0070%. It takes cost to reduce the N content, and the cost remarkably increases to reduce to less than 0.0010%. Therefore, the N content may be 0.0010% or more.

B, Ti, Nb, V, Ni, Cu, Ca, REM, W, Mg, Zr, As, Co, Sn, Pb, Y, and Hf are not essential elements, and are arbitrary elements which may be contained with a predetermined amount as a limit in the cold-rolled steel sheet.

(B: "0" (Zero) % to 0.0020%; Ti: "0" (Zero) % to 0.050%; Nb: "0" (Zero) % to 0.050%; V: "0" (Zero) % to 0.050%)

B contributes to improve the hardenability. However, when a B content is over 0.0020%, an iron-based boride is easy to be precipitated, and the effect of improvement in the hardenability cannot be obtained. Therefore, the B content is 0.0020% or less. Ti is bonded to N to form TiN, to thereby contribute to suppress nitriding of B. However, when a Ti content is over 0.050%, Ti iron-based carbide is formed, and carbon, which contributes to stabilize retained austenite, decreases, and the ductility is lowered. Therefore, the Ti content is 0.050% or less. Nb and V contribute to increase the strength and improve toughness by refining of grains. However, when Nb is over 0.050%, Nb iron-based carbide is formed, and carbon, which contributes to the stabilization of retained austenite, decreases, and the ductility is lowered. Therefore, an Nb content is 0.050% or less. Similarly, when V is over 0.050%, V iron-based carbide is formed, and carbon, which contributes to the stabilization of retained austenite, decreases, and therefore the ductility is lowered. Therefore, a V content is 0.050% or less. The B content is preferably 0.0003% or more, and the Ti content, the Nb content, and the V content are each preferably 0.005% or more to surely obtain the effects owing to the above-stated functions. Namely, it is preferable that "B: 0.0003% to 0.0020%", "Ti: 0.005% to 0.050%", "Nb: 0.005% to 0.050%" or "V: 0.005% to 0.050%", or any combination thereof is satisfied.

(Ni: "0" (Zero) % to 1.00%, Cu: "0" (Zero) % to 1.00%)

Ni and Cu contribute to secure the hardenability. However, when a content of Ni and/or Cu is over 1.00%, the weldability, hot workability, and so on are deteriorated. Therefore, the Ni content is 1.00% or less, and the Cu content is 1.00% or less. The Ni content and the Cu content are both preferably 0.01% or more, and more preferably 0.05% or more to surely obtain the effects owing to the above-stated actions. Namely, it is preferable that "Ni: 0.01% to 1.00%", or "Cu: 0.01% to 1.00%", or any combination thereof is satisfied.

(Ca or REM, or Both Thereof: "0" (Zero) % to 0.0300% in Total)

Ca and REM contribute to improve the strength and to improve the toughness owing to refinement of structure. However, when a sum of a Ca content and a REM content is over 0.0300%, castability and the hot workability are deteriorated. Therefore, the sum of the Ca content and the REM content is 0.0300% or less. The sum of the Ca content and the REM content is preferably 0.0005% or more to surely obtain the effects owing to the above-stated functions. Namely, it is preferable that "Ca or REM, or both thereof: 0.0005% to 0.0300%" is satisfied. REM indicates Sc, Y and elements which belong to lanthanoid series, and the "REM content" means a total content of these elements. Lanthanoid is often added industrially as a misch metal, for example, and a plurality of kinds of elements such as La and Ce are contained. A metal element which belongs to REM such as metal La or metal Ce may be individually added.

(W: "0" (Zero) % to 1.000%; Mg: "0" (Zero) % to 0.010%; Zr: "0" (Zero) % to 0.200%; as: "0" (Zero) % to 0.500%; Co: "0" (Zero) % to 1.000%; Sn: "0" (Zero) % to 0.200%; Pb: "0" (Zero) % to 0.200%; Y: "0" (Zero) % to 0.200%; Hf: "0" (Zero) % to 0.2000%)

W, Mg, and Zr contribute to suppress lowering of local ductility due to inclusions. For example, Mg contributes to reduce negative effect of the inclusions. However, when a W content is over 1.000%, workability is lowered. Therefore, the W content is 1.000% or less. When a Mg content is over 0.010%, cleanliness deteriorates. Therefore, the Mg content is 0.010% or less. When a Zr content is over 0.200%, the workability is lowered. Therefore, the Zr content is 0.200% or less. As contributes to improve the mechanical strength and to improve materials. However, when an As content is over 0.500%, the workability is lowered. Therefore, the As content is 0.500% or less. Co accelerates bainite transformation. In the TRIP steel, the bainite transformation is used, and therefore, Co is useful. However, when a Co content is over 1.000%, the weldability is worse. Therefore, the Co content is 1.000% or less. Sn and Pb contribute to improve the plating wettability and adhesiveness of a plating layer. However, when a content of Sn and/or Pb is over 0.200%, flaws are easy to occur in manufacturing, and the toughness is lowered. Therefore, the Sn content is 0.200% or less, and the Pb content is 0.200% or less. Y and Hf contribute to improve corrosion resistance. Y forms oxide in the steel, adsorbs hydrogen in the steel to thereby reduce diffusible hydrogen, and therefore, contributes to improve hydrogen embrittlement resistance. However, when an Y content is over 0.200% or an Hf content is over 0.2000%, the hole expandability deteriorates. Therefore, the Y content is 0.200% or less, and the Hf content is 0.2000% or less.

The W content is preferably 0.001% or more, the Mg content, the Zr content, the As content, the Co content, the Sn content, the Pb content, the Y content, and the Hf content are each preferably 0.0001% or more to surely obtain the effects owing to the above-stated functions. Namely, it is preferable that "W: 0.001% to 1.000%", "Mg: 0.0001% to 0.010%", "Zr: 0.0001% to 0.200%", "As: 0.0001% to 0.500%", "Co: 0.0001% to 1.000%", "Sn: 0.0001% to 0.200%", "Pb: 0.0001% to 0.2%, "Y: 0.0001% to 0.200%" or "Hf: 0.0001% to 0.2000%", or any combination thereof is satisfied.

Next, an example of a method of manufacturing the cold-rolled steel sheet according to the embodiment is described. According to the method described here, it is possible to manufacture the cold-rolled steel sheet according to the embodiment, but the method of manufacturing the cold-rolled steel sheet according to the embodiment is not limited thereto. Namely, a cold-rolled steel sheets manufactured by another method is within a scope of the embodiment as long as it includes the above-stated structure and chemical composition.

In this manufacturing method, hot-rolling of a slab heated to a temperature of 1250° C. or less is performed to obtain a hot-rolled sheet, the hot-rolled sheet is coiled at a temperature of 650° C. or less, cold-rolling of the hot-rolled sheet is performed with a reduction ratio of 70% or more to obtain a cold-rolled sheet, and continuous annealing of the cold-rolled sheet is performed at a temperature of 750° C. to 900° C. In the performing the hot-rolling, finish-rolling is performed at a temperature of 850° C. to 1000° C. under a state in which two phases of ferrite and austenite exist. A total reduction ratio at the last three stands is 60% or more in the finish-rolling, and cooling is started within one second from the end of the finish-rolling.

As the slab supplied for the hot-rolling, one which is casted from molten steel whose composition is adjusted such that the chemical composition is within the above-stated range is used. As the slab, a continuous casting slab and a slab made by a thin slab caster may be used. A process such as a continuous casting-direct rolling (CC-DR) process, in which hot rolling is performed immediately after a slab is cast, may be applied.

The slab heating temperature is 1250° C. or less. When the slab heating temperature is excessively high, not only the productivity deteriorates but also the manufacturing cost increases. The slab heating temperature is preferably 1200° C. or less. The slab heating temperature is preferably 1050° C. or more. When the slab heating temperature is less than 1050° C., a finish-rolling temperature is sometimes lowered, and a rolling load in the finish-rolling is sometimes high. The increase of the rolling load may incur the deterioration of rolling ability and a defective shape of the steel sheet (hot-rolled sheet) after the rolling.

When the hot-rolling is performed, the finish-rolling is performed at the temperature of 850° C. to 1000° C. under the state in which the two phases of ferrite and austenite exist. When the temperature of the finish-rolling (finish-rolling temperature) is less than 850° C., the rolling load may be high to incur the deterioration of the rolling ability and the defective shape of the hot-rolled sheet. The finish-rolling temperature is 1000° C. or less. This is because a grain diameter in the hot-rolled sheet is made small as much as possible. In the finish-rolling, a total reduction ratio from two stands prior to the last stand to the last stand, namely, the total reduction ratio at the last three stands is 60% or more, and cooling, for example, water cooling is started within one second from the end of the finish-rolling. When the total reduction ratio is less than 60%, the grain diameter in the hot-rolled sheet becomes coarse. When it takes a time over one second from the end of the finish-rolling to the start of the cooling, the grain diameter in the hot-rolled sheet becomes coarse.

The coiling of the hot-rolled sheet is performed at the temperature of 650° C. or less. When this temperature (coiling temperature) is 650° C., a thickness of oxide formed on a surface of the hot-rolled sheet excessively increases, and picklability deteriorates. The coiling temperature is preferably 500° C. or more. When the coiling temperature is less than 500° C., strength of the hot-rolled sheet may excessively increase, and cracks and defective shape sometimes occur during the cold-rolling.

Rough-rolled sheets after rough rolling may be joined together during hot-rolling to perform finish-rolling in a continuous manner. Further, finish-rolling may be performed after once coiling the rough-rolled sheet.

After the hot-rolled sheet is coiled, pickling of the hot-rolled sheet is preferably performed. Oxide on the surface of the hot-rolled sheet is removed by the pickling. Therefore, the pickling is extremely effective to improve galvanizing characteristics when a hot-dip galvanized layer or an alloyed hot-dip galvanized layer is formed later. The pickling may be performed once or divided into plural times.

Thereafter, the cold-rolling of the hot-rolled sheet is performed with a reduction ratio of 70% or more to obtain a cold-rolled sheet. When the reduction ratio of the cold-rolling is less than 70%, a recrystallization temperature is high and the sufficient ductility is not obtained. Besides, it is difficult to keep a shape of the steel sheet to be flat, and the ductility of the cold-rolled steel sheet being a final product deteriorates. The reduction ratio is preferably 90% or less. When the reduction ratio is over 90%, the rolling load becomes too large, and it becomes difficult to perform the cold-rolling. When the reduction ratio is over 90%, anisotropy may be large, and the hole expandability sometimes deteriorates. When the reduction ratio is 90% or less, the plane intensity ratio (the value of $I(111)/\{I(100)+I(110)\}$) of 2 or less can be obtained. The number of times of a rolling pass and a reduction ratio by each pass do not affect on the effects of the embodiment, and are not particularly limited.

After the cold-rolling, the continuous annealing of the cold-rolled sheet is performed at the temperature of 750° C. to 900° C. Owing to this continuous annealing, it is possible to lower the strength of the cold-rolled sheet which is raised by the cold-rolling to an appropriate level, and to obtain a desired structure containing an appropriate amount of retained austenite. Namely, dislocation introduced during the cold-rolling is freed by recovery, recrystallization or phase transformation, and stable retained austenite can be obtained by the continuous annealing. When the temperature of the continuous annealing is less than 750° C., non-recrystallized grains remain, and the sufficient ductility cannot be obtained. When the temperature of the continuous annealing is over 900° C., an excessive load is applied on a continuous annealing furnace. When the temperature of the continuous annealing is 750° C. or more, the area fraction of retained austenite ($V_{\gamma R}$) and the area fraction of martensite ($V_M$) of 1% or more in total can be obtained, and the product of the area fraction of retained austenite ($V_{\gamma R}$) and the carbon concentration in retained austenite ($C_{\gamma R}$) of 1 or more can be obtained.

The cold-rolled steel sheet may be manufactured as stated above.

When a galvanized cold-rolled steel sheet is manufactured, a hot-dip galvanized layer or an alloyed hot-dip galvanized layer is formed on a surface of the cold-rolled steel sheet. The hot-dip galvanized layer or the alloyed hot-dip galvanized layer is formed by performing a hot-dip galvanizing treatment after the continuous annealing or subsequent to the continuous annealing. Effects of suppression of formation of scales and improvement in corrosion resistance are obtained by the hot-dip galvanizing treatment. When the alloyed hot-dip galvanized layer is formed, an alloying temperature is 600° C. or less. When the alloying temperature is over 600° C., retained austenite is decomposed into ferrite and cementite, and therefore, the high ductility cannot be obtained.

The hot-dip galvanized layer or the alloyed hot-dip galvanized layer may contain Ni, Cu, Cr, Co, Al, Si, or Zn, or any combination thereof. When the galvanized cold-rolled steel sheet is manufactured, it is preferable that a base plating layer containing Ni, Cu, Co, or Fe, or any combination thereof is formed on the surface of the cold-rolled sheet between the cold-rolling and the continuous annealing. It is possible to improve adhesiveness of the hot-dip galvanized layer or the alloyed hot-dip galvanized layer by forming the base plating layer.

A plating layer may be formed by a electroplating method, but the hot-dip galvanizing method is preferable to form a thick plating layer.

Incidentally, the above-described embodiments are to be considered in all respects as illustrative and no restrictive. Namely, the present invention may be embodied in other specific forms without departing from the spirit or essential characteristics thereof.

EXAMPLES

Next, examples of the present invention are described. Conditions in the examples are a conditional example which is applied to verify feasibility and effects of the present invention, and the present invention is not limited to the conditional example. The present invention is able to apply various conditions within the range of the present invention to the extent to achieve the objects thereof.

First Experiment

In a first experiment, slabs were casted using steels (steel types a to r and A to G) including chemical compositions listed in Table 1, then slab heating, hot-rolling, cooling, coiling, pickling, cold-rolling, and continuous annealing were performed. A thickness of the cold-rolled steel sheet was 0.65 mm. Blanks in Table 1 each indicate that a content of a corresponding element was less than a detection limit. For a part of the cold-rolled steel sheets, hot-dip galvanized treatment and alloying treatment were performed after the continuous annealing. The temperature of the slab heating, the finish-rolling temperature during the hot-rolling, the total reduction ratio at the last three stands in the finish-rolling, the coiling temperature, the reduction ratio in the cold-rolling, the annealing temperature in the continuous annealing, and the alloying temperature in the alloying treatment are listed in Table 2 and Table 3. The cooling was started within one second from the end of the finish-rolling in all of the conditions. Underlines in Table 1, Table 2, or Table 3 each indicate that a numerical value thereof was out of a range of the present invention.

A sample was taken from each of obtained steels, then mechanical tests and a structure observation were performed.

As for the tensile property, a tensile test piece conforming to JIS Z 2201 was taken, a tensile test was performed in conformity to JIS Z 2241, and a yield strength (YP), a tensile strength (TS), and an elongation (EL) were measured. As for the hole expandability, a test was performed by the method described in JIS Z 2256. Namely, a hole with a diameter of 10 mm ($d_0$) was punched, the hole was expanded using a 60-degree conical punch such that a burr extended outside, and a hole diameter (d) when cracks penetrated a steel sheet was measured. Then a hole expansion ratio $\lambda(=((d-d_0)/d_0)\times 100)$ was calculated.

In the structure observation, the area fraction of martensite ($V_M$), the area fraction of ferrite ($V_F$), the area fraction of retained austenite ($V_{\gamma R}$) and the area fraction of bainite ($V_B$) were measured. To measure these area fractions, a sample was taken which had a cross-section in parallel with the rolling direction and the thickness direction of the hot-stamped part as an observation surface, the observation surface was electropolished, a part where a depth from a surface is ⅛ to ⅜ of a thickness of the steel sheet was observed by the FESEM, and the area fraction was measured by the EBSD method. In the observation, area fractions of each structure were measured in 10 visual fields at a magnification of 5000 times, and an average value thereof was adopted as the area fraction of each structure. The "OIM-Analysis 5" made by TSL solutions Co., Ltd. was used for analysis. The crystal orientation analysis was performed by the FESEM-EBSD method, and the identification of the structure and the specification of the plane intensity ratio (the value of $I(111)/\{I(100)+I(110)\}$) at the sheet thickness ¼t part were performed.

In the measurement of the carbon concentration ($C_{\gamma R}$) in retained austenite, the lattice constant was found from the midpoint of full width at half maximum of the plane intensity as for each of the (200) plane, the (220) plane, and the (311) plane of retained austenite by the X-ray diffraction whose target was Fe. An average value of these lattice constants was defined as the lattice constant of austenite ($a_0$), and the carbon concentration ($C_{\gamma R}$) was calculated from the above-stated expression 1.

Further, the sum (f_N) of the area fraction of retained austenite and the area fraction of martensite which were adjacent to bainite, a sum (f_s) of the area fraction of retained austenite and the area fraction of martensite which were not adjacent to bainite and existing at grain boundaries, and a sum (f_l) of the area fraction of retained austenite and the area fraction of martensite which were not adjacent to bainite and existing in grains were found. At this time, a sample was taken which had a cross-section in parallel with the rolling direction and the thickness direction of the hot-stamped part as an observation surface, the observation surface were corroded using the Nital reagent and the observation surface was observed with the SEM. A structure in which a block-like structure of bainite was observed was judged as bainite, and other island-shaped structures were judged as austenite and/or martensite.

These results are listed in Table 4 and Table 5. Here, it was judged to be good as for one whose yield strength (YP) was 400 MPa or less, tensile strength (TS) was 630 MPa or more, product (TS×EL) of the tensile strength (TS) and the elongation (EL) was 16500 MPa % or more, product ($TS^{1/3} \times \lambda$) of a cube root of the tensile strength (TS) and the hole expansion ratio ($\lambda$) was 810 $MPa^{1/3}$% or more. Underlines in Table 4 or Table 5 each indicate that a numerical value thereof was out of a desired range or the range of the present invention. When the yield strength (YP) is over 400 MP, a surface strain occurs and it is difficult to be processed. When the tensile strength (TS) is over 630 MPa, it is difficult to be processed. When the value of "TS×EL" is less than 16500 MPa %, fine press formability cannot be obtained. When the value of "$TS^{1/3} \times \lambda$" is less than 810 $MPa^{1/3}$%, fine press formability cannot be obtained. As listed in Table 4 and Table 5, in inventive examples, in which all of the conditions were within the range of the present invention, it was possible to obtain excellent ductility and hole expandability while securing the appropriate strength. On the other hand, in comparative examples, in which any one or more of the conditions were out of the range of the present invention, the desired strength, ductility and/or hole expandability could not be obtained.

TABLE 1

| STEEL TYPE | CHEMICAL COMPONENT (MASS %) | | | | | | | | | | | |
|---|---|---|---|---|---|---|---|---|---|---|---|---|
| | C | Si | Al | Mn | Cr | B | P | S | N | O | Ti | Nb |
| a | 0.034 | 0.05 | 0.878 | 1.01 | | | 0.004 | 0.0011 | 0.0026 | 0.0012 | | |
| b | 0.044 | 0.05 | 0.992 | 1.08 | | | 0.007 | 0.0014 | 0.0028 | 0.0011 | | |
| c | 0.047 | 0.04 | 1.532 | 1.28 | 0.19 | 0.0007 | 0.005 | 0.0015 | 0.0033 | 0.0009 | | |
| d | 0.057 | 0.02 | 1.476 | 1.25 | 0.11 | | 0.012 | 0.0033 | 0.0045 | 0.0024 | | |
| e | 0.046 | 0.04 | 1.451 | 0.98 | 0.33 | | 0.011 | 0.0023 | 0.0025 | 0.0008 | 0.029 | |
| f | 0.044 | 0.05 | 1.223 | 1.39 | | 0.0008 | 0.009 | 0.0038 | 0.0030 | 0.0012 | | 0.049 |
| g | 0.042 | 0.05 | 1.487 | 1.04 | | 0.0009 | 0.013 | 0.0027 | 0.0024 | 0.0018 | | |
| h | 0.048 | 0.07 | 1.387 | 0.88 | | 0.0008 | 0.010 | 0.0024 | 0.0020 | 0.0010 | 0.019 | 0.011 |
| i | 0.046 | 0.05 | 1.085 | 1.29 | | 0.0010 | 0.012 | 0.0029 | 0.0029 | 0.0013 | | |
| j | 0.047 | 0.08 | 1.523 | 1.35 | | | 0.009 | 0.0030 | 0.0025 | 0.0014 | | |
| k | 0.045 | 0.06 | 1.486 | 1.15 | 0.21 | | 0.008 | 0.0022 | 0.0024 | 0.0009 | | |
| l | 0.048 | 0.08 | 1.521 | 1.06 | 0.18 | 0.0012 | 0.014 | 0.0027 | 0.0040 | 0.0010 | | |
| m | 0.044 | 0.05 | 1.851 | 0.88 | 0.85 | | 0.012 | 0.0038 | 0.0029 | 0.0013 | | |
| n | 0.057 | 0.02 | 0.884 | 1.11 | 0.25 | 0.0019 | 0.008 | 0.0015 | 0.0024 | 0.0019 | | |
| o | 0.058 | 0.05 | 0.967 | 0.67 | 0.22 | | 0.009 | 0.0019 | 0.0016 | 0.0007 | 0.024 | 0.014 |
| p | 0.054 | 0.03 | 1.447 | 1.06 | | | 0.001 | 0.0022 | 0.0029 | 0.0014 | | |
| q | 0.056 | 0.08 | 1.257 | 0.85 | 0.18 | 0.0009 | 0.006 | 0.0011 | 0.0021 | 0.0009 | | |
| r | 0.058 | 0.02 | 1.553 | 0.97 | | 0.0007 | 0.009 | 0.0019 | 0.0025 | 0.0011 | 0.058 | |
| A | <u>0.028</u> | 0.07 | 1.458 | 1.13 | 0.19 | 0.0007 | 0.012 | 0.0038 | 0.0030 | 0.0024 | | |
| B | <u>0.082</u> | 0.05 | 1.512 | 1.32 | 0.22 | 0.0004 | 0.008 | 0.0021 | 0.0024 | 0.0016 | | |
| C | 0.042 | <u>0.72</u> | 1.448 | 1.22 | 0.32 | | 0.010 | 0.0023 | 0.0032 | 0.0022 | | |
| D | 0.038 | 0.33 | <u>2.027</u> | 1.29 | 0.55 | | 0.008 | 0.0019 | 0.0024 | 0.0010 | | |
| E | 0.044 | 0.48 | 1.448 | <u>0.45</u> | <u>0.12</u> | 0.0016 | 0.006 | 0.0024 | 0.0027 | 0.0008 | | |
| F | 0.052 | 0.51 | 1.269 | <u>1.51</u> | <u>1.68</u> | 0.0008 | 0.014 | 0.0026 | 0.0026 | 0.0023 | | |
| G | 0.047 | 0.42 | 1.863 | 1.36 | 0.20 | 0.0007 | <u>0.092</u> | 0.0020 | 0.0019 | 0.0024 | | |

| STEEL TYPE | CHEMICAL COMPONENT (MASS %) | | | | | | Ac3 (° C.) | Acf (° C.) | REMARKS |
|---|---|---|---|---|---|---|---|---|---|
| | V | Ni | Cu | Mo | Ca | REM | Mn + Cr | | |
| a | | | | 0.15 | | | 1.01 | 1203 | 714 | INVENTIVE EXAMPLE |
| b | | | | 0.21 | | | 1.08 | 1246 | 713 | INVENTIVE EXAMPLE |
| c | | | | 0.14 | | | 1.47 | 1439 | 714 | INVENTIVE EXAMPLE |
| d | | | | 0.11 | | | 1.36 | 1417 | 712 | INVENTIVE EXAMPLE |
| e | | | | 0.15 | | | 1.31 | 1431 | 719 | INVENTIVE EXAMPLE |
| f | | | | 0.14 | | | 1.39 | 1319 | 710 | INVENTIVE EXAMPLE |
| g | 0.045 | | | 0.23 | | | 1.04 | 1446 | 713 | INVENTIVE EXAMPLE |
| h | | | | 0.30 | | | 0.88 | 1412 | 716 | INVENTIVE EXAMPLE |
| i | | 0.29 | | 0.25 | | | 1.29 | 1267 | 706 | INVENTIVE EXAMPLE |

TABLE 1-continued

| | | | | | | | | |
|---|---|---|---|---|---|---|---|---|
| j | | | 0.32 | 0.18 | | 1.35 | 1435 | 711 | INVENTIVE EXAMPLE |
| k | | | | 0.42 | | 1.36 | 1437 | 716 | INVENTIVE EXAMPLE |
| l | | | | 0.18 | 0.0045 | 1.24 | 1450 | 717 | INVENTIVE EXAMPLE |
| m | | | | 0.23 | 0.0029 | 1.73 | 1581 | 729 | INVENTIVE EXAMPLE |
| n | | | | 0.17 | | 1.36 | 1182 | 716 | INVENTIVE EXAMPLE |
| o | | | | 0.11 | | 0.89 | 1238 | 721 | INVENTIVE EXAMPLE |
| p | 0.024 | | | 0.22 | | 1.06 | 1412 | 713 | INVENTIVE EXAMPLE |
| q | | | | 0.33 | | 1.03 | 1346 | 719 | INVENTIVE EXAMPLE |
| r | 0.029 | | | 0.31 | | 0.97 | 1487 | 713 | INVENTIVE EXAMPLE |
| A | | | | 0.15 | | 1.32 | 1430 | 716 | COMPARATIVE EXAMPLE |
| B | | | | 0.12 | | 1.54 | 1417 | 714 | COMPARATIVE EXAMPLE |
| C | | | | 0.22 | | 1.54 | 1445 | 736 | COMPARATIVE EXAMPLE |
| D | | | | 0.25 | | 1.84 | 1656 | 728 | COMPARATIVE EXAMPLE |
| E | | | | 0.15 | | <u>0.57</u> | 1453 | 734 | COMPARATIVE EXAMPLE |
| F | | | | 0.11 | | <u>3.19</u> | 1335 | 750 | COMPARATIVE EXAMPLE |
| G | | | | 0.34 | | 1.56 | 1653 | 724 | COMPARATIVE EXAMPLE |

TABLE 2

| CONDITION | STEEL TYPE | TYPE OF STEEL SHEET | SLAB HEATING TEMPERATURE (° C.) | FINISH-ROLLING TEMPERATURE (° C.) | TOTAL REDUCTION RATIO AT LAST THREE STANDS (%) |
|---|---|---|---|---|---|
| a-1 | a | COLD-ROLLED STEEL SHEET | 1220 | 920 | 70 |
| a-2 | a | COLD-ROLLED STEEL SHEET | 1250 | 890 | 70 |
| a-3 | a | COLD-ROLLED STEEL SHEET | 1240 | 920 | 75 |
| a-4 | a | ALLOYED HOT-DIP GALVANIZED STEEL SHEET | 1230 | 860 | 80 |
| a-5 | a | ALLOYED HOT-DIP GALVANIZED STEEL SHEET | 1220 | 900 | 70 |
| a-6 | a | ALLOYED HOT-DIP GALVANIZED STEEL SHEET | 1220 | 930 | 75 |
| a-7 | a | ALLOYED HOT-DIP GALVANIZED STEEL SHEET | 1210 | 980 | 60 |
| a-8 | a | ALLOYED HOT-DIP GALVANIZED STEEL SHEET | 1190 | <u>1020</u> | 60 |
| a-9 | a | ALLOYED HOT-DIP GALVANIZED STEEL SHEET | 1200 | 860 | 70 |
| a-10 | a | COLD-ROLLED STEEL SHEET | 1150 | <u>800</u> | 80 |
| b-1 | b | COLD-ROLLED STEEL SHEET | 1210 | 940 | 60 |
| b-2 | b | COLD-ROLLED STEEL SHEET | 1200 | 690 | 70 |
| b-3 | b | COLD-ROLLED STEEL SHEET | 1200 | 930 | 80 |
| b-4 | b | ALLOYED HOT-DIP GALVANIZED STEEL SHEET | 1220 | 900 | 75 |
| b-5 | b | ALLOYED HOT-DIP GALVANIZED STEEL SHEET | 1230 | 910 | 75 |
| b-6 | b | ALLOYED HOT-DIP GALVANIZED STEEL SHEET | 1240 | 930 | 80 |
| b-7 | b | ALLOYED HOT-DIP GALVANIZED STEEL SHEET | 1200 | 980 | 80 |
| b-8 | b | ALLOYED HOT-DIP GALVANIZED STEEL SHEET | 1200 | <u>1050</u> | 80 |
| b-9 | b | ALLOYED HOT-DIP GALVANIZED STEEL SHEET | 1210 | 860 | 80 |

TABLE 2-continued

| | | | | | |
|---|---|---|---|---|---|
| b-10 | b | COLD-ROLLED STEEL SHEET | 1150 | <u>800</u> | 80 |
| c-1 | c | COLD-ROLLED STEEL SHEET | 1230 | 900 | 60 |
| c-2 | c | COLD-ROLLED STEEL SHEET | 1200 | 910 | 75 |
| c-3 | c | COLD-ROLLED STEEL SHEET | 1210 | 920 | 85 |
| c-4 | c | ALLOYED HOT-DIP GALVANIZED STEEL SHEET | 1200 | 900 | 65 |
| c-5 | c | ALLOYED HOT-DIP GALVANIZED STEEL SHEET | 1180 | 900 | 70 |
| c-6 | c | ALLOYED HOT-DIP GALVANIZED STEEL SHEET | 1230 | 930 | 70 |
| c-7 | c | ALLOYED HOT-DIP GALVANIZED STEEL SHEET | 1270 | 880 | 65 |
| c-8 | c | ALLOYED HOT-DIP GALVANIZED STEEL SHEET | 1200 | <u>1050</u> | 65 |
| c-9 | c | ALLOYED HOT-DIP GALVANIZED STEEL SHEET | 1230 | 860 | 70 |
| c-10 | c | COLD-ROLLED STEEL SHEET | 1150 | <u>800</u> | 70 |
| d-1 | d | COLD-ROLLED STEEL SHEET | 1220 | 870 | 85 |
| d-2 | d | ALLOYED HOT-DIP GALVANIZED STEEL SHEET | 1230 | 950 | 85 |
| e-1 | e | COLD-ROLLED STEEL SHEET | 1270 | 970 | 75 |
| f-1 | f | COLD-ROLLED STEEL SHEET | 1260 | 950 | 70 |
| g-1 | g | COLD-ROLLED | 1260 | 980 | 60 |

| CONDITION | COILING TEMPERATURE (° C.) | STEEL SHEET REDUCTION RATIO IN COLD-ROLLING (%) | ANNEALING TEMPERATURE (° C.) | ALLOYING TEMPERATURE (° C.) | REMARKS |
|---|---|---|---|---|---|
| a-1 | 600 | 70 | 780 | — | INVENTIVE EXAMPLE |
| a-2 | 550 | 78 | 800 | — | INVENTIVE EXAMPLE |
| a-3 | 600 | 75 | 830 | — | INVENTIVE EXAMPLE |
| a-4 | 620 | 80 | 800 | 500 | INVENTIVE EXAMPLE |
| a-5 | 590 | 85 | 820 | 530 | INVENTIVE EXAMPLE |
| a-6 | 600 | 70 | 850 | 560 | INVENTIVE EXAMPLE |
| a-7 | 600 | 80 | 880 | <u>620</u> | COMPARATIVE EXAMPLE |
| a-8 | 620 | 85 | 800 | 520 | COMPARATIVE EXAMPLE |
| a-9 | <u>700</u> | 75 | 820 | 500 | COMPARATIVE EXAMPLE |
| a-10 | <u>450</u> | 70 | 800 | — | COMPARATIVE EXAMPLE |
| b-1 | 520 | 75 | 790 | — | INVENTIVE EXAMPLE |
| b-2 | 580 | 80 | 800 | — | INVENTIVE EXAMPLE |
| b-3 | 600 | 70 | 820 | — | INVENTIVE EXAMPLE |
| b-4 | 620 | 85 | 800 | 500 | INVENTIVE EXAMPLE |
| b-5 | 580 | 70 | 850 | 530 | INVENTIVE EXAMPLE |
| b-6 | 610 | 75 | 830 | 560 | INVENTIVE EXAMPLE |
| b-7 | 600 | 80 | 880 | <u>610</u> | COMPARATIVE EXAMPLE |
| b-8 | 620 | 85 | 860 | 520 | COMPARATIVE EXAMPLE |
| b-9 | <u>750</u> | 75 | 820 | 500 | COMPARATIVE EXAMPLE |
| b-10 | <u>450</u> | 70 | 800 | — | COMPARATIVE EXAMPLE |
| c-1 | 600 | 70 | 790 | — | INVENTIVE EXAMPLE |

TABLE 2-continued

| | | | | | |
|---|---|---|---|---|---|
| c-2 | 590 | 78 | 800 | — | INVENTIVE EXAMPLE |
| c-3 | 600 | 75 | 820 | — | INVENTIVE EXAMPLE |
| c-4 | 610 | 80 | 800 | 500 | INVENTIVE EXAMPLE |
| c-5 | 620 | 85 | 850 | 530 | INVENTIVE EXAMPLE |
| c-6 | 600 | 70 | 830 | 560 | INVENTIVE EXAMPLE |
| c-7 | 600 | 80 | 880 | <u>610</u> | COMPARATIVE EXAMPLE |
| c-8 | 620 | 85 | 800 | 520 | COMPARATIVE EXAMPLE |
| c-9 | <u>750</u> | 75 | 820 | 500 | COMPARATIVE EXAMPLE |
| c-10 | <u>450</u> | 70 | 800 | — | COMPARATIVE EXAMPLE |
| d-1 | 620 | 75 | 800 | — | INVENTIVE EXAMPLE |
| d-2 | 600 | 75 | 830 | 500 | INVENTIVE EXAMPLE |
| e-1 | 630 | 70 | 780 | — | INVENTIVE EXAMPLE |
| f-1 | 600 | 80 | 830 | — | INVENTIVE EXAMPLE |
| g-1 | 600 | 75 | 810 | — | INVENTIVE EXAMPLE |

TABLE 3

| CONDITION | STEEL TYPE | TYPE OF STEEL SHEET | SLAB HEATING TEMPERATURE (° C.) | FINISH-ROLLING TEMPERATURE (° C.) | TOTAL REDUCTION RATIO AT LAST THREE STANDS (%) |
|---|---|---|---|---|---|
| h-1 | h | COLD-ROLLED STEEL SHEET | 1280 | 960 | 75 |
| i-1 | i | COLD-ROLLED STEEL SHEET | 1230 | 910 | 75 |
| j-1 | j | ALLOYED HOT-DIP GALVANIZED STEEL SHEET | 1200 | 900 | 80 |
| k-1 | k | ALLOYED HOT-DIP GALVANIZED STEEL SHEET | 1200 | 930 | 90 |
| l-1 | l | ALLOYED HOT-DIP GALVANIZED STEEL SHEET | 1210 | 940 | 70 |
| m-1 | m | ALLOYED HOT-DIP GALVANIZED STEEL SHEET | 1230 | 920 | 60 |
| n-1 | n | COLD-ROLLED STEEL SHEET | 1220 | 910 | 65 |
| n-2 | n | COLD-ROLLED STEEL SHEET | 1240 | 920 | 65 |
| n-3 | n | COLD-ROLLED STEEL SHEET | 1210 | 920 | 70 |
| n-4 | n | ALLOYED HOT-DIP GALVANIZED STEEL SHEET | 1200 | 890 | 75 |
| n-5 | n | ALLOYED HOT-DIP GALVANIZED STEEL SHEET | 1220 | 900 | 80 |
| n-6 | n | ALLOYED HOT-DIP GALVANIZED STEEL SHEET | 1230 | 920 | 80 |
| n-7 | n | ALLOYED HOT-DIP GALVANIZED STEEL SHEET | 1240 | 980 | 65 |
| n-8 | n | ALLOYED HOT-DIP GALVANIZED STEEL SHEET | 1200 | <u>1050</u> | 70 |
| n-9 | n | ALLOYED HOT-DIP GALVANIZED STEEL SHEET | 1210 | 860 | 80 |
| n-10 | n | COLD-ROLLED STEEL SHEET | 1250 | <u>800</u> | 80 |
| o-1 | o | ALLOYED HOT-DIP GALVANIZED STEEL SHEET | 1270 | 960 | 70 |
| p-1 | p | ALLOYED HOT-DIP GALVANIZED STEEL SHEET | 1250 | 940 | 65 |
| q-1 | q | COLD-ROLLED STEEL SHEET | 1180 | 880 | 70 |
| q-2 | q | COLD-ROLLED STEEL SHEET | 1210 | 900 | 70 |
| q-3 | q | COLD-ROLLED STEEL SHEET | 1230 | 920 | 80 |

TABLE 3-continued

| | | | | | |
|---|---|---|---|---|---|
| q-4 | q | ALLOYED HOT-DIP GALVANIZED STEEL SHEET | 1220 | 910 | 80 |
| q-5 | q | ALLOYED HOT-DIP GALVANIZED STEEL SHEET | 1220 | 910 | 80 |
| q-6 | q | ALLOYED HOT-DIP GALVANIZED STEEL SHEET | 1230 | 890 | 80 |
| q-7 | q | ALLOYED HOT-DIP GALVANIZED STEEL SHEET | 1230 | 980 | 60 |
| q-8 | q | ALLOYED HOT-DIP GALVANIZED STEEL SHEET | 1210 | 1050 | 65 |
| q-9 | q | ALLOYED HOT-DIP GALVANIZED STEEL SHEET | 1220 | 860 | 70 |
| q-10 | q | COLD-ROLLED STEEL SHEET | 1200 | 800 | 75 |
| r-1 | r | ALLOYED HOT-DIP GALVANIZED STEEL SHEET | 1280 | 920 | 70 |
| A-1 | A | ALLOYED HOT-DIP GALVANIZED STEEL SHEET | 1230 | 920 | 65 |
| B-1 | B | COLD-ROLLED STEEL SHEET | 1210 | 930 | 65 |
| C-1 | C | ALLOYED HOT-DIP GALVANIZED STEEL SHEET | 1210 | 910 | 75 |
| D-1 | D | ALLOYED HOT-DIP GALVANIZED STEEL SHEET | 1230 | 900 | 85 |
| E-1 | E | COLD-ROLLED STEEL SHEET | 1200 | 910 | 70 |
| F-1 | F | COLD-ROLLED STEEL SHEET | 1210 | 920 | 60 |
| G-1 | G | COLD-ROLLED | 1230 | 920 | 60 |

| CONDITION | COILING TEMPERATURE (° C.) | STEEL SHEET REDUCTION RATIO IN COLD-ROLLING (%) | ANNEALING TEMPERATURE (° C.) | ALLOYING TEMPERATURE (° C.) | REMARKS |
|---|---|---|---|---|---|
| h-1 | 590 | 85 | 810 | — | INVENTIVE EXAMPLE |
| i-1 | 610 | 70 | 810 | — | INVENTIVE EXAMPLE |
| j-1 | 580 | 75 | 830 | 500 | INVENTIVE EXAMPLE |
| k-1 | 600 | 75 | 830 | 520 | INVENTIVE EXAMPLE |
| l-1 | 600 | 80 | 830 | 550 | INVENTIVE EXAMPLE |
| m-1 | 580 | 80 | 830 | 550 | INVENTIVE EXAMPLE |
| n-1 | 630 | 70 | 800 | — | INVENTIVE EXAMPLE |
| n-2 | 650 | 75 | 780 | — | INVENTIVE EXAMPLE |
| n-3 | 650 | 80 | 820 | — | INVENTIVE EXAMPLE |
| n-4 | 630 | 75 | 830 | 500 | INVENTIVE EXAMPLE |
| n-5 | 580 | 85 | 850 | 530 | INVENTIVE EXAMPLE |
| n-6 | 570 | 80 | 880 | 560 | INVENTIVE EXAMPLE |
| n-7 | 600 | 80 | 880 | 610 | COMPARATIVE EXAMPLE |
| n-8 | 620 | 85 | 800 | 520 | COMPARATIVE EXAMPLE |
| n-9 | 750 | 75 | 820 | 500 | COMPARATIVE EXAMPLE |
| n-10 | 450 | 70 | 800 | — | COMPARATIVE EXAMPLE |
| o-1 | 590 | 70 | 820 | 520 | INVENTIVE EXAMPLE |
| p-1 | 650 | 80 | 830 | 540 | INVENTIVE EXAMPLE |
| q-1 | 600 | 75 | 820 | — | INVENTIVE EXAMPLE |
| q-2 | 590 | 75 | 800 | — | INVENTIVE EXAMPLE |
| q-3 | 590 | 80 | 780 | — | INVENTIVE EXAMPLE |
| q-4 | 620 | 75 | 820 | 500 | INVENTIVE EXAMPLE |

TABLE 3-continued

| | | | | | |
|---|---|---|---|---|---|
| q-5 | 630 | 80 | 850 | 520 | INVENTIVE EXAMPLE |
| q-6 | 630 | 90 | 850 | 540 | INVENTIVE EXAMPLE |
| q-7 | 600 | 85 | 880 | <u>610</u> | COMPARATIVE EXAMPLE |
| q-8 | 620 | 85 | 800 | 520 | COMPARATIVE EXAMPLE |
| q-9 | <u>750</u> | 75 | 820 | 500 | COMPARATIVE EXAMPLE |
| q-10 | <u>450</u> | 70 | 800 | — | COMPARATIVE EXAMPLE |
| r-1 | 620 | 75 | 820 | 520 | INVENTIVE EXAMPLE |
| A-1 | 030 | 75 | 000 | 520 | COMPARATIVE EXAMPLE |
| B-1 | 620 | 70 | 810 | — | COMPARATIVE EXAMPLE |
| C-1 | 580 | 70 | 820 | 530 | COMPARATIVE EXAMPLE |
| D-1 | 600 | 80 | 850 | 550 | COMPARATIVE EXAMPLE |
| E-1 | 600 | 85 | 800 | — | COMPARATIVE EXAMPLE |
| F-1 | 620 | 80 | 810 | — | COMPARATIVE EXAMPLE |
| G-1 | 640 | 70 | 800 | — | COMPARATIVE EXAMPLE |

TABLE 4

| CONDITION | $V_M$ (%) | $V_F$ (%) | $V_{\gamma R}$ (%) | $V_{\gamma R} \times C_{\gamma R}$ | PLANE INTENSITY RATIO | YP (MPa) | TS (MPa) | EL (%) | λ (%) | $V_M + V_{\gamma R}$ (%) |
|---|---|---|---|---|---|---|---|---|---|---|
| a-1 | 0.3 | 96.7 | 2.5 | 1.21 | 1.325 | 248 | 394 | 46 | 153 | 2.8 |
| a-2 | 0.2 | 97.1 | 2.2 | 1.18 | 1.732 | 243 | 386 | 47 | 142 | 2.4 |
| a-3 | 0.4 | 97.0 | 2.1 | 1.24 | 1.657 | 242 | 385 | 47 | 148 | 2.5 |
| a-4 | 0.2 | 97.5 | 1.9 | 1.19 | 1.742 | 246 | 391 | 46 | 166 | 2.1 |
| a-5 | 0.0 | 98.0 | 1.7 | 1.11 | 1.674 | 244 | 388 | 47 | 157 | 1.7 |
| a-6 | 0.0 | 98.2 | 1.5 | 1.07 | 1.714 | 247 | 393 | 46 | 162 | 1.5 |
| a-7 | 0.0 | 98.6 | 0.2 | <u>0.11</u> | 1.532 | 251 | 388 | 31 | 110 | <u>0.2</u> |
| a-8 | 0.0 | 98.5 | 1.2 | <u>0.96</u> | 1.258 | 244 | 395 | 38 | 152 | 1.2 |
| a-9 | 0.0 | 95.0 | 4.2 | <u>0.97</u> | 1.493 | 251 | 385 | 37 | 115 | <u>4.2</u> |
| a-10 | 0.2 | 97.6 | 1.8 | 1.26 | <u>3.257</u> | 247 | 385 | 44 | 105 | 2.0 |
| b-1 | 0.2 | 96.6 | 2.7 | 1.41 | 1.287 | 290 | 448 | 42 | 156 | 2.9 |
| b-2 | 0.1 | 97.3 | 2.2 | 1.27 | 1.332 | 287 | 451 | 42 | 145 | 2.3 |
| b-3 | 0.1 | 97.2 | 2.3 | 1.33 | 1.524 | 274 | 460 | 41 | 150 | 2.4 |
| b-4 | 0.0 | 97.8 | 1.8 | 1.29 | 1.614 | 269 | 459 | 42 | 147 | 1.8 |
| b-5 | 0.0 | 97.6 | 2.0 | 1.24 | 1.712 | 274 | 462 | 41 | 152 | 2.0 |
| b-6 | 0.0 | 97.7 | 1.9 | 1.09 | 1.807 | 281 | 469 | 41 | 148 | 1.9 |
| b-7 | 0.0 | 98.1 | 0.2 | <u>0.11</u> | 1.532 | 285 | 462 | 31 | 108 | <u>0.2</u> |
| b-8 | 0.0 | 97.8 | 1.8 | <u>0.96</u> | 1.258 | 291 | 442 | 33 | 152 | 1.8 |
| b-9 | 0.0 | 95.9 | 3.4 | <u>0.97</u> | 1.493 | 288 | 463 | 34 | 110 | <u>3.4</u> |
| b-10 | 0.2 | 97.0 | 2.3 | 1.26 | <u>3.257</u> | 279 | 461 | 42 | 98 | 2.5 |
| c-1 | 0.1 | 97.5 | 2.0 | 1.17 | 1.412 | 287 | 465 | 41 | 148 | 2.1 |
| c-2 | 0.2 | 96.8 | 2.5 | 1.20 | 1.387 | 279 | 461 | 41 | 152 | 2.7 |
| c-3 | 0.1 | 96.6 | 2.7 | 1.22 | 1.555 | 285 | 458 | 40 | 149 | 2.8 |
| c-4 | 0.0 | 97.8 | 1.8 | 1.17 | 1.238 | 277 | 462 | 40 | 138 | 1.8 |
| c-5 | 0.0 | 98.0 | 1.7 | 1.11 | 1.621 | 284 | 466 | 41 | 141 | 1.7 |
| c-6 | 0.0 | 98.2 | 1.5 | 1.08 | 1.523 | 277 | 458 | 40 | 145 | 1.5 |
| c-7 | 0.0 | 98.3 | 0.2 | <u>0.09</u> | 1.614 | 281 | 459 | 32 | 111 | <u>0.2</u> |
| c-8 | 0.0 | 98.2 | 1.5 | <u>0.94</u> | 1.332 | 277 | 462 | 34 | 141 | 1.5 |
| c-9 | 0.0 | 96.2 | 3.1 | <u>0.88</u> | 1.421 | 281 | 471 | 33 | 101 | <u>3.1</u> |
| c-10 | 0.1 | 97.1 | 2.3 | 1.26 | <u>3.541</u> | 277 | 465 | 41 | 95 | 2.4 |
| d-1 | 0.2 | 97.2 | 2.1 | 1.15 | 1.562 | 384 | 611 | 32 | 138 | 2.3 |
| d-2 | 0.0 | 98.4 | 1.3 | 1.09 | 1.622 | 387 | 621 | 31 | 133 | 1.3 |
| e-1 | 0.2 | 97.4 | 1.9 | 1.21 | 1.632 | 288 | 456 | 42 | 145 | 2.1 |
| f-1 | 0.1 | 97.5 | 2.0 | 1.18 | 1.664 | 275 | 449 | 41 | 145 | 2.1 |
| g-1 | 0.2 | 97.2 | 2.1 | 1.15 | 1.486 | 269 | 442 | 42 | 151 | 2.3 |

| CONDITION | $V_B$ (%) | $V_B/V_{\gamma R}$ | TS × EL (MPa %) | $TS^{1/3} \times \lambda$ ($MPa^{1/3}$ %) | f_N (%) | f_s (%) | f_I (%) | REMARKS |
|---|---|---|---|---|---|---|---|---|
| a-1 | 0.5 | 0.2 | 18124 | 1122 | 0.16 | 2.58 | 0.06 | INVENTIVE EXAMPLE |

TABLE 4-continued

| | | | | | | | | |
|---|---|---|---|---|---|---|---|---|
| a-2 | 0.5 | 0.2 | 18124 | 1034 | 0.14 | 2.16 | 0.10 | INVENTIVE EXAMPLE |
| a-3 | 0.5 | 0.2 | 18124 | 1077 | 0.16 | 2.25 | 0.10 | INVENTIVE EXAMPLE |
| a-4 | 0.4 | 0.2 | 18124 | 1214 | 0.12 | 1.89 | 0.09 | INVENTIVE EXAMPLE |
| a-5 | 0.3 | 0.2 | 18124 | 1145 | 0.10 | 1.56 | 0.03 | INVENTIVE EXAMPLE |
| a-6 | 0.3 | 0.2 | 18124 | 1187 | 0.09 | 1.34 | 0.08 | INVENTIVE EXAMPLE |
| a-7 | 1.2 | 6.0 | 12028 | 802 | 0.20 | 0.00 | 0.00 | COMPARATIVE EXAMPLE |
| a-8 | 0.3 | 0.2 | 15010 | 1115 | 0.07 | 1.10 | 0.03 | COMPARATIVE EXAMPLE |
| a-9 | 0.8 | 0.2 | 14245 | 837 | 0.25 | 3.82 | 0.13 | COMPARATIVE EXAMPLE |
| a-10 | 0.4 | 0.2 | 16940 | 764 | 0.12 | 1.80 | 0.08 | COMPARATIVE EXAMPLE |
| b-1 | 0.5 | 0.2 | 18816 | 1194 | 0.17 | 2.64 | 0.10 | INVENTIVE EXAMPLE |
| b-2 | 0.4 | 0.2 | 18942 | 1112 | 0.14 | 2.05 | 0.12 | INVENTIVE EXAMPLE |
| b-3 | 0.4 | 0.2 | 18860 | 1158 | 0.14 | 2.21 | 0.05 | INVENTIVE EXAMPLE |
| b-4 | 0.4 | 0.2 | 19278 | 1134 | 0.10 | 1.66 | 0.04 | INVENTIVE EXAMPLE |
| b-5 | 0.4 | 0.2 | 18942 | 1175 | 0.12 | 1.82 | 0.06 | INVENTIVE EXAMPLE |
| b-6 | 0.4 | 0.2 | 19229 | 1150 | 0.11 | 1.71 | 0.08 | INVENTIVE EXAMPLE |
| b-7 | 1.7 | 8.5 | 14322 | 835 | 0.20 | 0.00 | 0.00 | COMPARATIVE EXAMPLE |
| b-8 | 0.4 | 0.2 | 14586 | 1158 | 0.11 | 1.64 | 0.05 | COMPARATIVE EXAMPLE |
| b-9 | 0.7 | 0.2 | 15742 | 851 | 0.21 | 3.13 | 0.06 | COMPARATIVE EXAMPLE |
| b-10 | 0.5 | 0.2 | 19362 | 757 | 0.14 | 2.23 | 0.13 | COMPARATIVE EXAMPLE |
| c-1 | 0.4 | 0.2 | 19065 | 1147 | 0.13 | 1.89 | 0.08 | INVENTIVE EXAMPLE |
| c-2 | 0.5 | 0.2 | 18901 | 1174 | 0.16 | 2.48 | 0.06 | INVENTIVE EXAMPLE |
| c-3 | 0.6 | 0.2 | 18320 | 1149 | 0.16 | 2.52 | 0.12 | INVENTIVE EXAMPLE |
| c-4 | 0.4 | 0.2 | 18480 | 1067 | 0.11 | 1.62 | 0.07 | INVENTIVE EXAMPLE |
| c-5 | 0.3 | 0.2 | 19106 | 1093 | 0.11 | 1.56 | 0.03 | INVENTIVE EXAMPLE |
| c-6 | 0.3 | 0.2 | 18320 | 1118 | 0.09 | 1.37 | 0.05 | INVENTIVE EXAMPLE |
| c-7 | 1.5 | 7.5 | 14688 | 856 | 0.20 | 0.00 | 0.00 | COMPARATIVE EXAMPLE |
| c-8 | 0.3 | 0.2 | 15708 | 1090 | 0.09 | 1.38 | 0.03 | COMPARATIVE EXAMPLE |
| c-9 | 0.7 | 0.2 | 15543 | 786 | 0.19 | 2.85 | 0.06 | COMPARATIVE EXAMPLE |
| c-10 | 0.5 | 0.2 | 19065 | 736 | 0.14 | 2.21 | 0.05 | COMPARATIVE EXAMPLE |
| d-1 | 0.5 | 0.2 | 19552 | 1171 | 0.14 | 2.05 | 0.12 | INVENTIVE EXAMPLE |
| d-2 | 0.3 | 0.2 | 19251 | 1135 | 0.08 | 1.20 | 0.02 | INVENTIVE EXAMPLE |
| e-1 | 0.5 | 0.2 | 19152 | 1116 | 0.12 | 1.93 | 0.05 | INVENTIVE EXAMPLE |
| f-1 | 0.4 | 0.2 | 18409 | 1110 | 0.12 | 1.93 | 0.05 | INVENTIVE EXAMPLE |
| g-1 | 0.5 | 0.2 | 18564 | 1150 | 0.14 | 2.05 | 0.12 | INVENTIVE EXAMPLE |

TABLE 5

| CONDITION | $V_M$ (%) | $V_F$ (%) | $V_{\gamma R}$ (%) | $V_{\gamma R} \times C_{\gamma R}$ | PLANE INTENSITY RATIO | YP (MPa) | TS (MPa) | EL (%) | λ (%) | $V_M + V_{\gamma R}$ (%) |
|---|---|---|---|---|---|---|---|---|---|---|
| h-1 | 0.3 | 97.5 | 1.8 | 1.32 | 1.388 | 279 | 452 | 41 | 148 | 2.1 |
| i-1 | 0.1 | 97.8 | 1.7 | 1.17 | 1.647 | 272 | 461 | 40 | 139 | 1.8 |

TABLE 5-continued

| | | | | | | | | | | |
|---|---|---|---|---|---|---|---|---|---|---|
| j-1 | 0.0 | 98.4 | 1.3 | 1.11 | 1.721 | 269 | 452 | 41 | 148 | 1.3 |
| k-1 | 0.0 | 98.6 | 1.2 | 1.08 | 1.275 | 275 | 461 | 41 | 139 | 1.2 |
| l-1 | 0.0 | 98.3 | 1.4 | 1.11 | 1.346 | 272 | 458 | 41 | 152 | 1.4 |
| m-1 | 0.0 | 98.2 | 1.5 | 1.09 | 1.241 | 281 | 461 | 40 | 155 | 1.5 |
| n-1 | 0.2 | 97.8 | 1.6 | 1.22 | 1.365 | 391 | 596 | 33 | 145 | 1.8 |
| n-2 | 0.1 | 97.8 | 1.7 | 1.36 | 1.654 | 387 | 608 | 32 | 140 | 1.8 |
| n-3 | 0.1 | 98.1 | 1.5 | 1.27 | 1.578 | 391 | 604 | 32 | 141 | 1.6 |
| n-4 | 0.0 | 98.6 | 1.2 | 1.12 | 1.458 | 388 | 612 | 31 | 135 | 1.2 |
| n-5 | 0.0 | 98.6 | 1.2 | 1.12 | 1.554 | 375 | 599 | 31 | 133 | 1.2 |
| n-6 | 0.0 | 98.7 | 1.1 | 1.08 | 1.397 | 383 | 610 | 31 | 138 | 1.1 |
| n-7 | 0.0 | 98.6 | 0.1 | <u>0.09</u> | 1.378 | 384 | 604 | 25 | 111 | <u>0.1</u> |
| n-8 | 0.0 | 98.6 | 1.2 | <u>0.94</u> | 1.354 | 394 | 611 | 22 | 141 | 1.2 |
| n-9 | 0.0 | 96.2 | 3.2 | <u>0.88</u> | 1.441 | 381 | 609 | 23 | 101 | <u>3.2</u> |
| n-10 | 0.1 | 97.1 | 2.3 | 1.26 | <u>3.247</u> | 377 | 613 | 31 | 95 | 2.4 |
| o-1 | 0.0 | 98.5 | 1.3 | 1.19 | 1.297 | 381 | 602 | 32 | 142 | 1.3 |
| p-1 | 0.0 | 98.5 | 1.2 | 1.13 | 1.331 | 379 | 599 | 32 | 144 | 1.2 |
| q-1 | 0.2 | 98.0 | 1.5 | 1.24 | 1.351 | 381 | 610 | 31 | 151 | 1.7 |
| q-2 | 0.1 | 98.0 | 1.5 | 1.27 | 1.276 | 378 | 608 | 31 | 143 | 1.6 |
| q-3 | 0.1 | 98.2 | 1.4 | 1.18 | 1.314 | 384 | 611 | 31 | 138 | 1.5 |
| q-4 | 0.0 | 98.7 | 1.1 | 1.13 | 1.175 | 379 | 601 | 31 | 133 | 1.1 |
| q-5 | 0.0 | 98.8 | 1.0 | 1.14 | 1.156 | 374 | 597 | 32 | 144 | 1.0 |
| q-6 | 0.0 | 98.8 | 1.0 | 1.09 | 1.111 | 385 | 612 | 31 | 142 | 1.0 |
| q-7 | 0.0 | 98.8 | 0.2 | <u>0.09</u> | 1.287 | 388 | 614 | 23 | 98 | <u>0.2</u> |
| q-8 | 0.0 | 98.7 | 1.1 | <u>0.94</u> | 1.312 | 379 | 605 | 21 | 141 | 1.1 |
| q-9 | 0.0 | 96.3 | 3.1 | <u>0.88</u> | 1.233 | 388 | 611 | 20 | 89 | <u>3.1</u> |
| q-10 | 0.2 | 97.0 | 2.3 | 1.26 | <u>3.541</u> | 385 | 607 | 31 | 95 | 2.5 |
| r-1 | 0.0 | 98.3 | 1.4 | 1.23 | 1.248 | 381 | 612 | 31 | 151 | 1.4 |
| A-1 | 0.2 | 98.9 | 0.7 | <u>0.65</u> | 1.245 | 201 | <u>345</u> | 48 | 145 | <u>0.9</u> |
| B-1 | 0.3 | 94.8 | 4.0 | 1.52 | 1.341 | <u>405</u> | <u>782</u> | 28 | 102 | <u>4.3</u> |
| C-1 | 0.1 | 99.9 | 0.0 | <u>0.00</u> | 1.824 | <u>231</u> | 448 | 25 | 133 | <u>0.1</u> |
| D-1 | 0.1 | 94.9 | 4.2 | 5.46 | 1.322 | 236 | 451 | 32 | 110 | <u>4.3</u> |
| E-1 | 0.2 | 99.4 | 0.2 | <u>0.02</u> | 1.884 | 244 | 395 | 27 | 142 | <u>0.4</u> |
| F-1 | 0.5 | 97.3 | 1.8 | 1.15 | 1.534 | 275 | 463 | 31 | 115 | 2.3 |
| G-1 | 0.1 | 98.3 | 1.3 | 1.08 | 1.457 | 258 | 462 | 31 | 105 | 1.4 |

| CONDITION | $V_B$ (%) | $V_B/V_{\gamma R}$ | TS × EL (MPa %) | $TS^{1/3}$ × λ ($MPa^{1/3}$ %) | f_N (%) | f_s (%) | f_I (%) | REMARKS |
|---|---|---|---|---|---|---|---|---|
| h-1 | 0.4 | 0.2 | 18532 | 1136 | 0.12 | 1.89 | 0.09 | INVENTIVE EXAMPLE |
| i-1 | 0.4 | 0.2 | 18440 | 1074 | 0.11 | 1.62 | 0.07 | INVENTIVE EXAMPLE |
| j-1 | 0.3 | 0.2 | 18532 | 1136 | 0.08 | 1.17 | 0.05 | INVENTIVE EXAMPLE |
| k-1 | 0.2 | 0.2 | 18901 | 1074 | 0.07 | 1.09 | 0.04 | INVENTIVE EXAMPLE |
| l-1 | 0.3 | 0.2 | 18778 | 1172 | 0.08 | 1.25 | 0.07 | INVENTIVE EXAMPLE |
| m-1 | 0.3 | 0.2 | 18440 | 1197 | 0.09 | 1.37 | 0.05 | INVENTIVE EXAMPLE |
| n-1 | 0.4 | 0.2 | 19668 | 1220 | 0.10 | 1.66 | 0.04 | INVENTIVE EXAMPLE |
| n-2 | 0.4 | 0.2 | 19456 | 1186 | 0.11 | 1.60 | 0.09 | INVENTIVE EXAMPLE |
| n-3 | 0.3 | 0.2 | 19328 | 1192 | 0.09 | 1.47 | 0.04 | INVENTIVE EXAMPLE |
| n-4 | 0.2 | 0.2 | 18972 | 1146 | 0.07 | 1.07 | 0.06 | INVENTIVE EXAMPLE |
| n-5 | 0.2 | 0.2 | 18569 | 1121 | 0.07 | 1.10 | 0.03 | INVENTIVE EXAMPLE |
| n-6 | 0.2 | 0.2 | 18910 | 1170 | 0.06 | 0.98 | 0.06 | INVENTIVE EXAMPLE |
| n-7 | 1.3 | <u>13.0</u> | <u>15100</u> | 938 | 0.10 | 0.00 | 0.00 | COMPARATIVE EXAMPLE |
| n-8 | 0.2 | 0.2 | <u>13442</u> | 1196 | 0.07 | 1.07 | 0.06 | COMPARATIVE EXAMPLE |
| n-9 | 0.6 | 0.2 | <u>14007</u> | 856 | 0.20 | 2.94 | 0.06 | COMPARATIVE EXAMPLE |
| n-10 | 0.5 | 0.2 | 19003 | <u>807</u> | 0.14 | 2.16 | 0.10 | COMPARATIVE EXAMPLE |
| o-1 | 0.2 | 0.2 | 19264 | 1199 | 0.08 | 1.17 | 0.05 | INVENTIVE EXAMPLE |
| p-1 | 0.3 | 0.2 | 19168 | 1214 | 0.07 | 1.07 | 0.06 | INVENTIVE EXAMPLE |
| q-1 | 0.3 | 0.2 | 18910 | 1281 | 0.11 | 1.56 | 0.03 | INVENTIVE EXAMPLE |
| q-2 | 0.4 | 0.2 | 18848 | 1211 | 0.09 | 1.46 | 0.05 | INVENTIVE EXAMPLE |
| q-3 | 0.3 | 0.2 | 18941 | 1171 | 0.09 | 1.38 | 0.03 | INVENTIVE EXAMPLE |

TABLE 5-continued

| | | | | | | | | |
|---|---|---|---|---|---|---|---|---|
| q-4 | 0.2 | 0.2 | 18631 | 11222 | 0.06 | 0.98 | 0.06 | INVENTIVE EXAMPLE |
| q-5 | 0.2 | 0.2 | 19104 | 1213 | 0.06 | 0.90 | 0.04 | INVENTIVE EXAMPLE |
| q-6 | 0.2 | 0.2 | 18972 | 1206 | 0.06 | 0.90 | 0.04 | INVENTIVE EXAMPLE |
| q-7 | 1.0 | <u>5.0</u> | <u>14122</u> | 833 | 0.15 | 0.03 | 0.02 | COMPARATIVE EXAMPLE |
| q-8 | 0.2 | 0.2 | <u>12705</u> | 1193 | 0.07 | 1.00 | 0.03 | COMPARATIVE EXAMPLE |
| q-9 | 0.6 | 0.2 | <u>12220</u> | <u>755</u> | 0.18 | 2.82 | 0.10 | COMPARATIVE EXAMPLE |
| q-10 | 0.5 | 0.2 | 18817 | <u>804</u> | 0.16 | 2.28 | 0.07 | COMPARATIVE EXAMPLE |
| r-1 | 0.3 | 0.2 | 18972 | 1282 | 0.09 | 1.26 | 0.05 | INVENTIVE EXAMPLE |
| A-1 | 0.2 | 0.2 | 16560 | 1017 | 0.05 | 0.81 | 0.04 | COMPARATIVE EXAMPLE |
| B-1 | 0.9 | 0.2 | 21896 | 940 | 026 | 3.83 | 0.21 | COMPARATIVE EXAMPLE |
| C-1 | 0.0 | — | <u>11200</u> | 1018 | 0.01 | 0.09 | 0.01 | COMPARATIVE EXAMPLE |
| D-1 | 0.8 | 0.2 | <u>14432</u> | 844 | 0.25 | 3.96 | 0.09 | COMPARATIVE EXAMPLE |
| E-1 | 0.2 | 0.5 | <u>10665</u> | 1042 | 0.20 | — | — | COMPARATIVE EXAMPLE |
| F-1 | 0.4 | 0.2 | <u>14353</u> | 890 | 1.11 | 1.17 | 0.02 | COMPARATIVE EXAMPLE |
| G-1 | 0.3 | 0.2 | <u>14322</u> | 812 | 0.09 | 1.05 | 0.26 | COMPARATIVE EXAMPLE |

Second Experiment

In a second experiment, slabs were casted using steels (steel types a2 to n2 and A2 to B2) including chemical compositions listed in Table 6, then slab heating, hot-rolling, cooling, coiling, pickling, cold-rolling, and continuous annealing were performed. A thickness of the cold-rolled steel sheet was 0.65 mm. As listed in Table 6, W, Mg, Zr, As, Co, Sn, Pb, Y or Hf was contained in these steels. Blanks in Table 6 each indicate that a content of a corresponding element was less than a detection limit. For a part of the cold-rolled steel sheets, hot-dip galvanized treatment and alloying treatment were performed after the continuous annealing. The temperature of the slab heating, the finish-rolling temperature during the hot-rolling, the total reduction ratio at the last three stands in the finish-rolling, the coiling temperature, the reduction ratio in the cold-rolling, the annealing temperature in the continuous annealing, and the alloying temperature in the alloying treatment are listed in Table 7. The cooling was started within one second from the end of the finish-rolling in all of the conditions. Underlines in Table 6 or Table 7 each indicate that a numerical value thereof was out of the range of the present invention.

A sample was taken from each of obtained steels, then mechanical tests and structure observation were performed as same as the first experiment. These results are listed in Table 8. Here, evaluations were performed with the same criteria as the first experiment. Underlines in Table 8 each indicate that a numerical value thereof was out of the desired range or the range of the present invention. As listed in Table 8, in inventive examples, in which all of the conditions were within the range of the present invention, it was possible to obtain excellent ductility and hole expandability while securing the appropriate strength. Under the conditions each using the steel types a2 to f2, whose Cr content was 0.3% or more, it was possible to suppress excessive increase of strength, although the C content was relatively high. This means that it is easy to suppress the increase of the strength when the Cr content is 0.3% or more. On the other hand, in comparative examples, in which any one or more of the conditions were out of the range of the present invention, the desired strength, ductility and/or hole expandability could not be obtained.

TABLE 6

| STEEL TYPE | CHEMICAL COMPOUND (MASS %) | | | | | | | | | | | | |
|---|---|---|---|---|---|---|---|---|---|---|---|---|---|
| | C | Si | Al | Mn | Cr | B | P | S | N | O | Ti | Nb | V |
| A2 | <u>0.028</u> | 0.01 | 1.645 | 0.60 | 0.60 | | 0.006 | 0.0031 | 0.0030 | 0.0024 | | | |
| a2 | 0.046 | 0.03 | 1.520 | 0.79 | 0.57 | | 0.008 | 0.0025 | 0.0024 | 0.0019 | | | |
| b2 | 0.051 | 0.01 | 1.654 | 0.61 | 0.62 | | 0.006 | 0.0031 | 0.0030 | 0.0024 | | | |
| c2 | 0.060 | 0.03 | 1.560 | 0.65 | 0.43 | | 0.006 | 0.0035 | 0.0029 | 0.0024 | | | |
| d2 | 0.056 | 0.08 | 1.236 | 0.82 | 0.49 | | 0.008 | 0.0020 | 0.0024 | 0.0018 | | | |
| e2 | 0.072 | 0.01 | 1.654 | 0.61 | 0.62 | | 0.006 | 0.0031 | 0.0030 | 0.0024 | | | |
| B2 | <u>0.085</u> | 0.01 | 1.645 | 0.60 | 0.60 | | 0.006 | 0.0031 | 0.0030 | 0.0024 | | | |
| f2 | 0.051 | 0.01 | 1.654 | 0.70 | 0.40 | | 0.006 | 0.0031 | 0.0030 | 0.0024 | | | |
| g2 | 0.051 | 0.01 | 1.654 | 1.00 | | | 0.006 | 0.0031 | 0.0030 | 0.0023 | | | |
| h2 | 0.050 | 0.01 | 1.654 | 1.02 | | | 0.006 | 0.0031 | 0.0030 | 0.0021 | | | |
| i2 | 0.050 | 0.02 | 1.654 | 1.03 | | | 0.006 | 0.0031 | 0.0030 | 0.0021 | | | |
| j2 | 0.049 | 0.01 | 1.598 | 0.97 | | | 0.006 | 0.0030 | 0.0030 | 0.0019 | | | |
| k2 | 0.051 | 0.01 | 1.644 | 0.80 | | | 0.006 | 0.0030 | 0.0030 | 0.0019 | | | |

TABLE 6-continued

| | | | | | | | | |
|---|---|---|---|---|---|---|---|---|
| l2 | 0.050 | 0.02 | 1.654 | 0.90 | 0.006 | 0.0030 | 0.0030 | 0.0019 |
| m2 | 0.049 | 0.01 | 1.640 | 1.20 | 0.006 | 0.0030 | 0.0030 | 0.0019 |
| n2 | 0.049 | 0.01 | 1.620 | 1.10 | 0.006 | 0.0030 | 0.0030 | 0.0019 |

| STEEL TYPE | CHEMICAL COMPOUND (MASS %) | | | | | | Mn + Cr | Ac3 (° C.) | Ac1 (° C.) | REMARKS |
|---|---|---|---|---|---|---|---|---|---|---|
| | Ni | Cu | Mo | Ca | REM | OTHERS | | | | |
| A2 | 0.16 | 0.05 | 0.12 | | | | 1.20 | 1505 | 724 | COMPARATIVE EXAMPLE |
| a2 | | | 0.14 | | | | 1.36 | 1456 | 725 | INVENTIVE EXAMPLE |
| b2 | 0.16 | 0.05 | 0.16 | | | | 1.23 | 1507 | 725 | INVENTIVE EXAMPLE |
| c2 | | | 0.15 | | | | 1.08 | 1461 | 724 | INVENTIVE EXAMPLE |
| d2 | 0.16 | 0.05 | 0.15 | | | | 1.31 | 1328 | 722 | INVENTIVE EXAMPLE |
| e2 | 0.16 | 0.05 | 0.12 | | | | 1.23 | 1488 | 725 | INVENTIVE EXAMPLE |
| B2 | 0.16 | 0.05 | 0.12 | | | | 1.20 | 1480 | 724 | COMPARATIVE EXAMPLE |
| f2 | | | 0.15 | | | Sn: 0.002 | 1.10 | 1501 | 723 | INVENTIVE EXAMPLE |
| g2 | | | 0.22 | | | W: 0.002 | 1.00 | 1498 | 713 | INVENTIVE EXAMPLE |
| h2 | | | 0.34 | | | As: 0.002 | 1.02 | 1502 | 712 | INVENTIVE EXAMPLE |
| i2 | | | 0.42 | | | Mg: 0.001 | 1.03 | 1505 | 713 | INVENTIVE EXAMPLE |
| j2 | | | 0.18 | | | Zr: 0.001 | 0.97 | 1476 | 713 | INVENTIVE EXAMPLE |
| k2 | | | 0.12 | | | Hf: 0.0033 | 0.80 | 1497 | 715 | INVENTIVE EXAMPLE |
| l2 | | | 0.15 | | | Pb: 0.003 | 0.90 | 1500 | 714 | INVENTIVE EXAMPLE |
| m2 | | | 0.11 | | | Y: 0.004 | 1.20 | 1484 | 710 | INVENTIVE EXAMPLE |
| n2 | | | 0.14 | | | Co: 0.003 | 1.10 | 1480 | 712 | INVENTIVE EXAMPLE |

TABLE 7

| CONDITION | STEEL TYPE | TYPE OF STEEL SHEET | SLAB HEATING TEMPERATURE (° C.) | FINISH-ROLLING TEMPERATURE (° C.) | TOTAL REDUCTION RATIO AT LAST THREE STANDS (%) |
|---|---|---|---|---|---|
| A2-1 | A2 | COLD-ROLLED STEEL SHEET | 1250 | 930 | 70 |
| a2-1 | a2 | COLD-ROLLED STEEL SHEET | 1250 | 930 | 70 |
| a2-2 | a2 | COLD-ROLLED STEEL SHEET | 1250 | 890 | 70 |
| a2-3 | 32 | COLD-ROLLED STEEL SHEET | 1250 | 920 | 75 |
| a2-4 | a2 | ALLOYED HOT-DIP GALVANIZED STEEL SHEET | 1250 | 860 | 80 |
| a2-5 | a2 | ALLOYED HOT-DIP GALVANIZED STEEL SHEET | 1250 | 900 | 70 |
| a2-6 | a2 | ALLOYED HOT-DIP GALVANIZED STEEL SHEET | 1250 | 930 | 75 |
| a2-7 | a2 | ALLOYED HOT-DIP GALVANIZED STEEL SHEET | 1250 | 980 | 60 |
| b2-1 | b2 | COLD-ROLLED STEEL SHEET | 1250 | 940 | 60 |
| b2-2 | b2 | COLD-ROLLED STEEL SHEET | 1250 | 890 | 70 |
| b2-3 | b2 | COLD-ROLLED STEEL SHEET | 1250 | 930 | 80 |
| b2-4 | b2 | ALLOYED HOT-DIP GALVANIZED STEEL SHEET | 1250 | 900 | 75 |
| b2-5 | b2 | ALLOYED HOT-DIP GALVANIZED STEEL SHEET | 1250 | 910 | 75 |
| b2-6 | b2 | ALLOYED HOT-DIP GALVANIZED STEEL SHEET | 1250 | 930 | 80 |
| b2-7 | b2 | ALLOYED HOT-DIP GALVANIZED STEEL SHEET | 1250 | 880 | 80 |

TABLE 7-continued

| | | | | | |
|---|---|---|---|---|---|
| c2-1 | c2 | COLD-ROLLED STEEL SHEET | 1250 | 900 | 60 |
| c2-2 | c2 | COLD-ROLLED STEEL SHEET | 1250 | 910 | 75 |
| c2-3 | c2 | COLD-ROLLED STEEL SHEET | 1250 | 920 | 85 |
| c2-4 | c2 | ALLOYED HOT-DIP GALVANIZED STEEL SHEET | 1250 | 900 | 65 |
| c2-5 | c2 | ALLOYED HOT-DIP GALVANIZED STEEL SHEET | 1250 | 900 | 70 |
| c2-6 | c2 | ALLOYED HOT-DIP GALVANIZED STEEL SHEET | 1250 | 930 | 70 |
| c2-7 | c2 | ALLOYED HOT-DIP GALVANIZED STEEL SHEET | 1250 | 980 | 65 |
| d2-1 | d2 | COLD-ROLLED STEEL SHEET | 1250 | 870 | 85 |
| d2-2 | d2 | ALLOYED HOT-DIP GALVANIZED STEEL SHEET | 1250 | 950 | 85 |
| e2-1 | e2 | COLD-ROLLED STEEL SHEET | 1250 | 970 | 75 |
| B2-1 | B2 | COLD-ROLLED STEEL SHEET | 1250 | 950 | 70 |
| f2-1 | f2 | ALLOYED HOT-DIP GALVANIZED STEEL SHEET | 1250 | 960 | 75 |
| g2-1 | g2 | COLD-ROLLED STEEL SHEET | 1250 | 910 | 75 |
| h2-1 | h2 | ALLOYED HOT-DIP GALVANIZED STEEL SHEET | 1250 | 900 | 80 |
| i2-1 | i2 | ALLOYED HOT-DIP GALVANIZED STEEL SHEET | 1250 | 930 | 90 |
| j2-1 | j2 | ALLOYED HOT-DIP GALVANIZED STEEL SHEET | 1250 | 940 | 70 |
| k2-1 | k2 | ALLOYED HOT-DIP GALVANIZED STEEL SHEET | 1250 | 920 | 60 |
| l2-1 | l2 | ALLOYED HOT-DIP GALVANIZED STEEL SHEET | 1250 | 910 | 65 |
| m2-1 | m2 | ALLOYED HOT-DIP GALVANIZED STEEL SHEET | 1250 | 960 | 70 |
| n-1 | n2 | ALLOYED HOT-DIP GALVANIZED STEEL SHEET | 1250 | 940 | 65 |

| CONDITION | COILING TEMPERATURE (%) | REDUCTION RATIO IN COLD-ROLLING (%) | ANNEALING TEMPERATURE (° C.) | ALLOYING TEMPERATURE (° C.) | REMARKS |
|---|---|---|---|---|---|
| A2-1 | 600 | 70 | 790 | — | COMPARATIVE EXAMPLE |
| a2-1 | 600 | 70 | 780 | — | INVENTIVE EXAMPLE |
| a2-2 | 550 | 78 | 800 | — | INVENTIVE EXAMPLE |
| a2-3 | 600 | 75 | 830 | — | INVENTIVE EXAMPLE |
| a2-4 | 620 | 80 | 800 | 500 | INVENTIVE EXAMPLE |
| a2-5 | 590 | 85 | 820 | 530 | INVENTIVE EXAMPLE |
| a2-6 | 600 | 70 | 850 | 560 | INVENTIVE EXAMPLE |
| a2-7 | 600 | 80 | 800 | <u>620</u> | COMPARATIVE EXAMPLE |
| b2-1 | 550 | 75 | 790 | — | INVENTIVE EXAMPLE |
| b2-2 | 600 | 80 | 800 | — | INVENTIVE EXAMPLE |
| b2-3 | 600 | 70 | 820 | — | INVENTIVE EXAMPLE |
| b2-4 | 600 | 85 | 800 | 500 | INVENTIVE EXAMPLE |
| b2-5 | 600 | 70 | 850 | 530 | INVENTIVE EXAMPLE |
| b2-6 | 600 | 75 | 830 | 560 | INVENTIVE EXAMPLE |
| b2-7 | 600 | 80 | 800 | <u>610</u> | COMPARATIVE EXAMPLE |
| c2-1 | 600 | 70 | 790 | — | INVENTIVE EXAMPLE |
| c2-2 | 590 | 78 | 800 | — | INVENTIVE EXAMPLE |

TABLE 7-continued

| | | | | | |
|---|---|---|---|---|---|
| c2-3 | | 600 | 75 | 620 | — | INVENTIVE EXAMPLE |
| c2-4 | | 610 | 80 | 800 | 500 | INVENTIVE EXAMPLE |
| c2-5 | | 620 | 85 | 850 | 530 | INVENTIVE EXAMPLE |
| c2-6 | | 600 | 70 | 830 | 560 | INVENTIVE EXAMPLE |
| c2-7 | | 600 | 80 | 880 | <u>610</u> | COMPARATIVE EXAMPLE |
| d2-1 | | 620 | 75 | 790 | — | INVENTIVE EXAMPLE |
| d2-2 | | 600 | 75 | 820 | 500 | INVENTIVE EXAMPLE |
| e2-1 | | 630 | 70 | 790 | — | INVENTIVE EXAMPLE |
| B2-1 | | 600 | 80 | 790 | — | COMPARATIVE EXAMPLE |
| f2-1 | | 590 | 85 | 620 | 490 | INVENTIVE EXAMPLE |
| g2-1 | | 610 | 70 | 820 | — | INVENTIVE EXAMPLE |
| h2-1 | | 580 | 75 | 820 | 510 | INVENTIVE EXAMPLE |
| i2-1 | | 600 | 75 | 820 | 510 | INVENTIVE EXAMPLE |
| j2-1 | | 600 | 80 | 820 | 510 | INVENTIVE EXAMPLE |
| k2-1 | | 590 | 80 | 820 | 510 | INVENTIVE EXAMPLE |
| l2-1 | | 630 | 70 | 820 | 490 | INVENTIVE EXAMPLE |
| m2-1 | | 590 | 70 | 820 | 510 | INVENTIVE EXAMPLE |
| n-1 | | 650 | 80 | 820 | 510 | INVENTIVE EXAMPLE |

TABLE 8

| CONDITION | $V_M$ (%) | $V_F$ (%) | $V_{\gamma R}$ (%) | $V_{\gamma R} \times C_{\gamma R}$ | PLANE INTENSITY RATIO | YP (MPa) | TS (MPa) | EL (%) | $\lambda$ (%) | $V_M + V_{\gamma R}$ (%) |
|---|---|---|---|---|---|---|---|---|---|---|
| A2-1 | 0.0 | 99.8 | 0.2 | <u>0.18</u> | 1.575 | 203 | 303 | 43 | 140 | <u>0.2</u> |
| a2-1 | 0.2 | 97.1 | 2.2 | 2.42 | 1.599 | 252 | 415 | 44 | 142 | 2.4 |
| a2-2 | 0.3 | 97.0 | 2.2 | 2.42 | 1.473 | 252 | 421 | 42 | 147 | 2.5 |
| a2-3 | 0.7 | 96.8 | 2.0 | 2.40 | 1.638 | 255 | 423 | 41 | 168 | 2.7 |
| a2-4 | 0.3 | 97.5 | 1.9 | 1.67 | 1.572 | 258 | 422 | 41 | 155 | 2.2 |
| a2-5 | 0.3 | 97.6 | 1.7 | 1.53 | 1.610 | 255 | 425 | 40 | 160 | 2.0 |
| a2-6 | 0.4 | 96.9 | 1.5 | 1.20 | 1.416 | 254 | 420 | 40 | 163 | 1.9 |
| a2-7 | 0.2 | 97.6 | 0.3 | <u>0.21</u> | 1.673 | 250 | 418 | <u>32</u> | <u>108</u> | 0.5 |
| b2-1 | 0.4 | 96.7 | 2.3 | 2.53 | 1.396 | 271 | 452 | 40 | 130 | 2.7 |
| b2-2 | 0.5 | 96.6 | 2.3 | 2.53 | 1.416 | 272 | 456 | 39 | 135 | 2.8 |
| b2-3 | 0.6 | 96.8 | 2.1 | 2.52 | 1.581 | 274 | 460 | 38 | 150 | 2.7 |
| b2-4 | 0.5 | 97.1 | 1.9 | 1.71 | 1.662 | 275 | 459 | 38 | 142 | 2.4 |
| b2-5 | 0.4 | 97.4 | 1.8 | 1.62 | 1.719 | 273 | 461 | 38 | 150 | 2.2 |
| b2-6 | 0.4 | 97.6 | 1.6 | 1.28 | 1.387 | 270 | 455 | 38 | 148 | 2.0 |
| b2-7 | 0.4 | 97.5 | 0.4 | <u>0.28</u> | 1.358 | 267 | 455 | <u>30</u> | <u>98</u> | <u>0.8</u> |
| c2-1 | 0.3 | 96.6 | 2.5 | 3.00 | 1.713 | 304 | 500 | 38 | 120 | 2.8 |
| c2-2 | 0.3 | 95.5 | 2.5 | 2.75 | 1.722 | 305 | 507 | 37 | 122 | 2.8 |
| c2-3 | 0.3 | 97.0 | 2.2 | 2.86 | 1.380 | 307 | 513 | 36 | 133 | 2.5 |
| c2-4 | 0.3 | 97.1 | 2.1 | 2.00 | 1.502 | 309 | 510 | 35 | 133 | 2.4 |
| c2-5 | 0.3 | 97.3 | 2.0 | 1.80 | 1.389 | 306 | 512 | 35 | 140 | 2.3 |
| c2-6 | 0.3 | 97.3 | 1.9 | 1.52 | 1.360 | 304 | 509 | 35 | 135 | 2.2 |
| c2-7 | 0.3 | 98.9 | 0.6 | <u>0.36</u> | 1.540 | 300 | 507 | <u>29</u> | <u>80</u> | <u>0.9</u> |
| d2-1 | 0.3 | 96.9 | 2.3 | 2.76 | 1.541 | 309 | 502 | 39 | 119 | 2.6 |
| d2-2 | 0.4 | 97.1 | 2.0 | 2.40 | 1.466 | 285 | 503 | 38 | 110 | 2.4 |
| e2-1 | 0.3 | 96.4 | 2.7 | 3.24 | 1.570 | 357 | 588 | 35 | 104 | 3.0 |
| B2-1 | 1.0 | 94.0 | 3.7 | 4.07 | 1.622 | <u>433</u> | <u>702</u> | 27 | 43 | <u>4.7</u> |
| f2-1 | 0.2 | 97.2 | 2.2 | 2.20 | 1.665 | 300 | 445 | 42 | 139 | 2.4 |
| g2-1 | 0.3 | 97.1 | 2.1 | 2.31 | 1.547 | 325 | 475 | 40 | 160 | 2.4 |
| h2-1 | 0.2 | 97.0 | 2.3 | 2.30 | 1.577 | 297 | 472 | 40 | 138 | 2.5 |
| i2-1 | 0.2 | 97.2 | 2.2 | 2.20 | 1.642 | 323 | 475 | 40 | 162 | 2.4 |
| j2-1 | 0.2 | 97.1 | 2.2 | 2.20 | 1.601 | 306 | 470 | 40 | 161 | 2.4 |
| k2-1 | 0.1 | 97.1 | 2.3 | 2.30 | 1.347 | 296 | 468 | 41 | 130 | 2.4 |

TABLE 8-continued

| | | | | | | | | | | |
|---|---|---|---|---|---|---|---|---|---|---|
| l2-1 | 0.1 | 97.5 | 2.0 | 2.40 | 1.424 | 317 | 450 | 42 | 148 | 2.1 |
| m2-1 | 0.2 | 97.1 | 2.2 | 2.20 | 1.648 | 303 | 473 | 39 | 137 | 2.4 |
| n-1 | 0.0 | 97.3 | 2.3 | 2.99 | 1.696 | 296 | 435 | 43 | 148 | 2.3 |

| CONDITION | $V_B$ (%) | $V_B/V_{\gamma R}$ | TS × EL (MPa %) | $TS^{1/3}$ × λ ($MPa^{1/3}$ %) | f_N (%) | f_s (%) | f_I (%) | REMARKS |
|---|---|---|---|---|---|---|---|---|
| A2-1 | 0.0 | 0.2 | <u>13029</u> | 940 | 0.01 | 0.18 | 0.01 | COMPARATIVE EXAMPLE |
| a2-1 | 0.5 | 0.2 | 18260 | 1059 | 0.15 | 2.16 | 0.09 | INVENTIVE EXAMPLE |
| a2-2 | 0.5 | 0.2 | 17682 | 1102 | 0.15 | 2.25 | 0.10 | INVENTIVE EXAMPLE |
| a2-3 | 0.5 | 0.2 | 17343 | 1261 | 0.16 | 2.43 | 0.11 | INVENTIVE EXAMPLE |
| a2-4 | 0.4 | 0.2 | 17302 | 1163 | 0.12 | 1.94 | 0.09 | INVENTIVE EXAMPLE |
| a2-5 | 0.4 | 0.2 | 17000 | 1203 | 0.12 | 1.78 | 0.10 | INVENTIVE EXAMPLE |
| a2-6 | 1.2 | 0.6 | 16800 | 1221 | 0.20 | 0.00 | 1.70 | INVENTIVE EXAMPLE |
| a2-7 | 1.7 | <u>3.4</u> | <u>13376</u> | <u>808</u> | 0.45 | 0.03 | 0.02 | COMPARATIVE EXAMPLE |
| b2-1 | 0.6 | 0.2 | 18080 | 998 | 0.17 | 2.46 | 0.08 | INVENTIVE EXAMPLE |
| b2-2 | 0.6 | 0.2 | 17784 | 1039 | 0.17 | 2.58 | 0.05 | INVENTIVE EXAMPLE |
| b2-3 | 0.5 | 0.2 | 17480 | 1158 | 0.15 | 2.41 | 0.08 | INVENTIVE EXAMPLE |
| b2-4 | 0.5 | 0.2 | 17442 | 1095 | 0.14 | 2.16 | 0.10 | INVENTIVE EXAMPLE |
| b2-5 | 0.4 | 0.2 | 17288 | 1159 | 0.13 | 2.02 | 0.04 | INVENTIVE EXAMPLE |
| b2-6 | 0.4 | 0.2 | 17063 | 1138 | 0.12 | 1.78 | 0.10 | INVENTIVE EXAMPLE |
| b2-7 | 1.7 | <u>2.1</u> | <u>13650</u> | <u>754</u> | 0.73 | 0.05 | 0.02 | COMPARATIVE EXAMPLE |
| c2-1 | 0.6 | 0.2 | 19000 | 952 | 0.17 | 2.49 | 0.14 | INVENTIVE EXAMPLE |
| c2-2 | 1.7 | 0.6 | 18759 | 973 | 0.20 | 0.00 | 2.60 | INVENTIVE EXAMPLE |
| c2-3 | 0.6 | 0.2 | 18468 | 1065 | 0.15 | 2.25 | 0.10 | INVENTIVE EXAMPLE |
| c2-4 | 0.5 | 0.2 | 17850 | 1063 | 0.14 | 2.14 | 0.12 | INVENTIVE EXAMPLE |
| c2-5 | 0.4 | 0.2 | 18022 | 1120 | 0.13 | 2.07 | 0.10 | INVENTIVE EXAMPLE |
| c2-6 | 0.5 | 0.2 | 17764 | 1078 | 0.13 | 1.96 | 0.11 | INVENTIVE EXAMPLE |
| c2-7 | 0.2 | 0.2 | 14703 | <u>638</u> | 0.05 | 0.81 | 0.04 | COMPARATIVE EXAMPLE |
| d2-1 | 0.5 | 0.2 | 19578 | 946 | 0.16 | 2.31 | 0.13 | INVENTIVE EXAMPLE |
| d2-2 | 0.5 | 0.2 | 19114 | 875 | 0.14 | 2.14 | 0.12 | INVENTIVE EXAMPLE |
| e2-1 | 0.6 | 0.2 | 20580 | 871 | 0.18 | 2.71 | 0.06 | INVENTIVE EXAMPLE |
| B2-1 | 1.3 | 0.3 | 18954 | <u>382</u> | 0.29 | 4.18 | 0.23 | COMPARATIVE EXAMPLE |
| f2-1 | 0.4 | 0.2 | 18468 | 1061 | 0.15 | 0.02 | 0.01 | INVENTIVE EXAMPLE |
| g2-1 | 0.5 | 0.2 | 19143 | 1248 | 0.14 | 0.03 | 0.01 | INVENTIVE EXAMPLE |
| h2-1 | 0.5 | 0.2 | 18880 | 1074 | 0.15 | 0.03 | 0.01 | INVENTIVE EXAMPLE |
| i2-1 | 0.4 | 0.2 | 18858 | 1264 | 0.14 | 0.03 | 0.01 | INVENTIVE EXAMPLE |
| j2-1 | 0.5 | 0.2 | 18800 | 1252 | 0.14 | 0.03 | 0.01 | INVENTIVE EXAMPLE |
| k2-1 | 0.5 | 0.2 | 19188 | 1009 | 0.15 | 0.03 | 0.01 | INVENTIVE EXAMPLE |
| l2-1 | 0.4 | 0.2 | 18900 | 1134 | 0.13 | 0.03 | 0.01 | INVENTIVE EXAMPLE |
| m2-1 | 0.5 | 0.2 | 18447 | 1067 | 0.14 | 0.03 | 0.01 | INVENTIVE EXAMPLE |
| n-1 | 0.4 | 0.2 | 18705 | 1121 | 0.14 | 0.03 | 0.01 | INVENTIVE EXAMPLE |

Third Experiment

In a third experiment, slabs were casted using steels (steel types a3 to d3 and A3 to H3) including chemical compositions listed in Table 9, then slab heating, hot-rolling, cooling, coiling, pickling, cold-rolling, and continuous annealing were performed. A thickness of the cold-rolled steel sheet was 0.65 mm. Blanks in Table 9 each indicate that a content of a corresponding element was less than a detection limit. The temperature of the slab heating, the finish-rolling temperature during the hot-rolling, the total reduction ratio at the last three stands in the finish-rolling, the coiling temperature, the reduction ratio in the cold-rolling, and the annealing temperature in the continuous annealing, and the alloying temperature in the alloying treatment are listed in Table 10. The cooling was started within one second from the end of the finish-rolling in all of the conditions. Underlines in Table 9 or Table 10 each indicate that a numerical value thereof was out of the range of the present invention.

A sample was taken from each of obtained steels, then mechanical tests and structure observation were performed as same as the first experiment. These results are listed in Table 11. Here, evaluations were performed with the same criteria as the first experiment. Underlines in Table 11 each indicate that a numerical value thereof was out of the desired range or the range of the present invention. As listed in Table 11, in inventive examples, in which all of the conditions were within the range of the present invention, it was possible to obtain the excellent ductility and hole expandability while securing the appropriate strength. On the other hand, in comparative examples, in which any one or more of the conditions were out of the range of the present invention, the desired strength, ductility and/or hole expandability could not be obtained.

TABLE 9

| STEEL TYPE | C | Si | Al | Mn | Cr | B | P | S | N | O | Ti | Nb | V |
|---|---|---|---|---|---|---|---|---|---|---|---|---|---|
| a3 | 0.070 | 0.05 | 1.600 | 0.40 | 0.92 | | 0.010 | 0.0025 | 0.0024 | 0.0019 | | | |
| b3 | 0.071 | 0.01 | 1.654 | 0.23 | 0.50 | | 0.010 | 0.0025 | 0.0025 | 0.0019 | | | |
| c3 | 0.071 | 0.03 | 1.560 | | 0.80 | | 0.010 | 0.0010 | 0.0030 | 0.0019 | | | |
| d3 | 0.070 | 0.08 | 1.236 | | 1.30 | | 0.010 | 0.0010 | 0.0030 | 0.0019 | | | |
| A3 | 0.071 | 0.01 | 1.654 | 0.40 | 1.40 | | 0.010 | 0.0024 | 0.0029 | 0.0019 | | | |
| B3 | 0.069 | 0.01 | 1.654 | 0.10 | 0.58 | | 0.010 | 0.0024 | 0.0029 | 0.0019 | | | |
| C3 | 0.070 | 0.05 | 1.550 | 1.00 | 0.15 | | 0.010 | 0.0020 | 0.0030 | 0.0003 | | | |
| D3 | 0.048 | 0.53 | 0.030 | 1.20 | | | 0.010 | 0.0020 | 0.0030 | 0.0003 | | | |
| E3 | 0.048 | 0.05 | 0.770 | 1.20 | | | 0.010 | 0.0020 | 0.0030 | 0.0003 | | | |
| F3 | 0.055 | <u>1.50</u> | <u>0.030</u> | 1.40 | | | 0.010 | 0.0024 | 0.0030 | 0.0019 | | | |
| G3 | 0.054 | 0.05 | 0.800 | <u>2.00</u> | | | 0.010 | 0.0024 | 0.0027 | 0.0019 | | | |
| H3 | <u>0.120</u> | 0.01 | 0.820 | 1.40 | | | 0.010 | 0.0025 | 0.0028 | 0.0019 | | | |

| STEEL TYPE | Ni | Cu | Mo | Ca | REM | OTHERS | Mn + Cr | Ac3 (° C.) | Ac1 (° C.) | REMARKS |
|---|---|---|---|---|---|---|---|---|---|---|
| a3 | | | 0.09 | | | | 1.32 | 1486 | 736 | INVENTIVE EXAMPLE |
| b3 | | | 0.09 | | | | 0.73 | 1515 | 729 | INVENTIVE EXAMPLE |
| c3 | | | 0.09 | | | | 0.80 | 1473 | 737 | INVENTIVE EXAMPLE |
| d3 | | | 0.09 | | | | 1.30 | 1341 | 747 | INVENTIVE EXAMPLE |
| A3 | | | 0.08 | | | | 1.80 | 1491 | 743 | COMPARATIVE EXAMPLE |
| B3 | | | 0.08 | | | | 0.68 | 1510 | 732 | COMPARATIVE EXAMPLE |
| C3 | | | 0.10 | | | | 1.15 | 1448 | 716 | COMPARATIVE EXAMPLE |
| D3 | | | 0.15 | | | | 1.20 | 868 | 726 | COMPARATIVE EXAMPLE |
| E3 | | | 0.15 | | | | 1.20 | 1142 | 712 | COMPARATIVE EXAMPLE |
| F3 | | | 0.10 | | | | 1.40 | 901 | 752 | COMPARATIVE EXAMPLE |
| G3 | | | 0.10 | | | | <u>2.00</u> | 1126 | 703 | COMPARATIVE EXAMPLE |
| H3 | | | 0.10 | | | | 1.40 | 1127 | 708 | COMPARATIVE EXAMPLE |

TABLE 10

| CONDITION | STEEL TYPE | TYPE OF STEEL SHEET | SLAB HEATING TEMPERATURE (° C.) | FINISH-ROLLING TEMPERATURE (° C.) | TOTAL REDUCTION RATIO AT LAST THREE STANDS (%) |
|---|---|---|---|---|---|
| a3-1 | a3 | COLD-ROLLED STEEL SHEET | 1250 | 950 | 80 |
| b3-1 | b3 | COLD-ROLLED STEEL SHEET | 1250 | 955 | 80 |

TABLE 10-continued

| | | | | | |
|---|---|---|---|---|---|
| c3-1 | c3 | COLD-ROLLED STEEL SHEET | 1250 | 939 | 80 |
| d3-1 | d3 | COLD-ROLLED STEEL SHEET | 1250 | 949 | 80 |
| A3-1 | A3 | COLD-ROLLED STEEL SHEET | 1250 | 969 | 80 |
| B3-1 | B3 | COLD-ROLLED STEEL SHEET | 1250 | 949 | 80 |
| C3-1 | C3 | COLD-ROLLED STEEL SHEET | 1250 | 930 | 80 |
| D3-1 | D3 | COLD-ROLLED STEEL SHEET | 1250 | 939 | 80 |
| E3-1 | E3 | COLD-ROLLED STEEL SHEET | 1250 | 970 | 80 |
| F3-1 | F3 | COLD-ROLLED STEEL SHEET | 1250 | 930 | 80 |
| G3-1 | G3 | COLD-ROLLED STEEL SHEET | 1250 | 943 | 80 |
| H3-1 | H3 | COLD-ROLLED STEEL SHEET | 1250 | 948 | 80 |

| CONDITION | COILING TEMPERATURE (° C.) | REDUCTION RATIO IN COLD-ROLLING (%) | ANNEALING TEMPERATURE (° C.) | REMARKS |
|---|---|---|---|---|
| a3-1 | 610 | 80 | 820 | INVENTIVE EXAMPLE |
| b3-1 | 600 | 80 | 830 | INVENTIVE EXAMPLE |
| c3-1 | 620 | 80 | 840 | INVENTIVE EXAMPLE |
| d3-1 | 500 | 80 | 850 | INVENTIVE EXAMPLE |
| A3-1 | 600 | 80 | 790 | COMPARATIVE EXAMPLE |
| B3-1 | 610 | 80 | 790 | COMPARATIVE EXAMPLE |
| C3-1 | 616 | 80 | 790 | COMPARATIVE EXAMPLE |
| D3-1 | 610 | 80 | 790 | COMPARATIVE EXAMPLE |
| E3-1 | 640 | 80 | 790 | COMPARATIVE EXAMPLE |
| F3-1 | 600 | 80 | 850 | COMPARATIVE EXAMPLE |
| G3-1 | 600 | 80 | 850 | COMPARATIVE EXAMPLE |
| H3-1 | 600 | 80 | 850 | COMPARATIVE EXAMPLE |

TABLE 11

| CONDITION | $V_M$ (%) | $V_F$ (%) | $V_{\gamma R}$ (%) | $V_{\gamma R} \times C_{\gamma R}$ | PLANE INTENSITY RATIO | YP (MPa) | TS (MPa) | EL (%) | λ (%) | $V_M + V_{\gamma R}$ (%) |
|---|---|---|---|---|---|---|---|---|---|---|
| a3-1 | 0.6 | 97.2 | 2.1 | 2.31 | 1.698 | 298 | 463 | 36.7 | 133 | 2.7 |
| b3-1 | 0.8 | 96.5 | 1.9 | 2.09 | 1.687 | 299 | 446 | 38.2 | 135 | 2.7 |
| c3-1 | 0.4 | 96.0 | 2.4 | 2.64 | 1.700 | 297 | 472 | 37.1 | 155 | 2.8 |
| d3-1 | 0.3 | 95.6 | 2.6 | 2.86 | 1.720 | 287 | 478 | 37.4 | 131 | 2.9 |
| A3-1 | 2.8 | 94.2 | 2.8 | 2.49 | 1.759 | 238 | 498 | 30.1 | 95 | 5.6 |
| B3-1 | 0.0 | 97.0 | 0.2 | 0.21 | 1.347 | 299 | 420 | 30.1 | 118 | 0.2 |
| C3-1 | 0.9 | 95.7 | 3.4 | 3.57 | 1.657 | 396 | 660 | 27.8 | 101 | 4.3 |
| D3-1 | 0.9 | 94.4 | 2.8 | 3.08 | 2.312 | 341 | 510 | 40.2 | 88 | 3.7 |
| E3-1 | 0.3 | 96.2 | 1.2 | 1.32 | 1.865 | 279 | 456 | 32.1 | 100 | 1.5 |
| F3-1 | 0.8 | 95.6 | 2.1 | 2.14 | 2.311 | 305 | 510 | 34.6 | 90 | 2.9 |
| G3-1 | 1.9 | 95.4 | 0.8 | 0.69 | 1.976 | 245 | 488 | 32.9 | 99 | 2.7 |
| H3-1 | 1.0 | 89.4 | 5.2 | 5.33 | 1.991 | 350 | 663 | 30.2 | 90 | 6.2 |

| CONDITION | $V_B$ (%) | $V_B/V_{\gamma R}$ | TS × EL (MPa %) | $TS^{1/3} \times \lambda$ ($MPa^{1/3}$ %) | f_N (%) | f_s (%) | f_I (%) | REMARKS |
|---|---|---|---|---|---|---|---|---|
| a3-1 | 0.1 | 0.05 | 16999 | 1029 | 0.15 | 2.46 | 0.09 | INVENTIVE EXAMPLE |
| b3-1 | 0.8 | 0.42 | 17033 | 1031 | 0.17 | 2.49 | 0.11 | INVENTIVE EXAMPLE |

TABLE 11-continued

| | | | | | | | | |
|---|---|---|---|---|---|---|---|---|
| c3-1 | 1.2 | 0.50 | 17511 | 1207 | 0.17 | 2.55 | 0.08 | INVENTIVE EXAMPLE |
| d3-1 | 1.5 | 0.58 | 17881 | 1024 | 0.17 | 2.58 | 0.15 | INVENTIVE EXAMPLE |
| A3-1 | 0.2 | 0.07 | 14981 | 753 | 0.32 | 5.10 | 0.18 | COMPARATIVE EXAMPLE |
| B3-1 | 2.8 | 14.00 | 12642 | 884 | 0.01 | 0.18 | 0.01 | COMPARATIVE EXAMPLE |
| C3-1 | 0.0 | 0.00 | 18348 | 879 | 0.27 | 3.91 | 0.12 | COMPARATIVE EXAMPLE |
| D3-1 | 1.9 | 0.68 | 20502 | 703 | 0.23 | 3.40 | 0.07 | COMPARATIVE EXAMPLE |
| E3-1 | 2.3 | 1.92 | 14638 | 770 | 0.09 | 1.35 | 0.06 | COMPARATIVE EXAMPLE |
| F3-1 | 1.5 | 0.71 | 17646 | 719 | 2.52 | 0.38 | 0.00 | COMPARATIVE EXAMPLE |
| G3-1 | 1.9 | 2.37 | 16042 | 779 | 2.38 | 0.32 | 0.00 | COMPARATIVE EXAMPLE |
| H3-1 | 4.4 | 0.85 | 20023 | 783 | 5.46 | 0.74 | 0.00 | COMPARATIVE EXAMPLE |

INDUSTRIAL APPLICABILITY

The present invention may be used for industries relating to a cold-rolled steel sheet and a galvanized cold-rolled steel sheet having, for example, strength of 380 MPa to 630 MPa and excellent in press formability.

The invention claimed is:

1. A cold-rolled steel sheet, comprising:
a chemical composition expressed by, in mass %:
Si: 0.01% to 0.50%;
Mn or Cr, or both thereof: 0.70% to 1.50% in total;
C: 0.030% to 0.060% when Cr: "0" (zero) % or more and less than 0.30%, 0.030% to 0.080% when Cr: 0.30% or more and 1.50% or less;
Al: 0.800% to 2.000%;
P: 0.030% or less;
S: 0.0100% or less;
Mo: 0.10% to 0.50%;
O: 0.0070% or less;
N: 0.0070% or less;
B: "0" (zero) % to 0.0020%;
Ti: "0" (zero) % to 0.050%;
Nb: "0" (zero) % to 0.050%;
V: "0" (zero) % to 0.050%;
Ni: "0" (zero) % to 1.00%;
Cu: "0" (zero) % to 1.00%;
Ca or REM, or both thereof: "0" (zero) % to 0.0300% in total;
W: "0" (zero) % to 1.000%;
Mg: "0" (zero) % to 0.010%;
Zr: "0" (zero) % to 0.200%;
As: "0" (zero) % to 0.500%;
Co: "0" (zero) % to 1.000%;
Sn: "0" (zero) % to 0.200%;
Pb: "0" (zero) % to 0.200%;
Y: "0" (zero) % to 0.200%;
Hf: "0" (zero) % to 0.2000%; and
the balance: Fe and impurities; and
a structure expressed by:
an area fraction of ferrite: 95% or more;
an area fraction of retained austenite and an area fraction of martensite: 1% to 3% in total;
a product of the area fraction of retained austenite and a carbon concentration in retained austenite: 1 or more;
a value of I(111)/{I(100)+I(110)} at a region where a depth from a surface is ¼ of a thickness of the cold-rolled steel sheet when intensity of a (hkl) plane is expressed by I(hkl): 2 or less.

2. The cold-rolled steel sheet according to claim 1, wherein the chemical composition satisfies:
Cr: 0.30% to 0.80%; or
Mn: 0.40% to 1.00%; or
both thereof.

3. The cold-rolled steel sheet according to claim 1, wherein the chemical composition satisfies:
B: 0.0003% to 0.0020%;
Ti: 0.005% to 0.050%;
Nb: 0.005% to 0.050%; or
V: 0.005% to 0.050%; or
any combination thereof.

4. The cold-rolled steel sheet according to claim 1, wherein the chemical composition satisfies:
Ni: 0.01% to 1.00%; or
Cu: 0.01% to 1.00%; or
both thereof.

5. The cold-rolled steel sheet according to claim 1, wherein the chemical composition satisfies
Ca or REM, or both thereof: 0.0005% to 0.0300% in total.

6. The cold-rolled steel sheet according to claim 1, wherein the chemical composition satisfies:
W: 0.001% to 1.000%;
Mg: 0.0001% to 0.010%;
Zr: 0.0001% to 0.200%;
As: 0.0001% to 0.500%;
Co: 0.0001% to 1.000%;
Sn: 0.0001% to 0.200%;
Pb: 0.0001% to 0.200%;
Y: 0.0001% to 0.200%; or
Hf: 0.0001% to 0.2000%; or
any combination thereof.

7. A galvanized cold-rolled steel sheet, comprising:
the cold-rolled steel sheet according to claim 1; and
a hot-dip galvanized layer or an alloyed hot-dip galvanized layer on a surface of the cold-rolled steel sheet.

8. A method of manufacturing the cold-rolled steel sheet according to claim 1, comprising:
performing hot-rolling of a slab heated to a temperature of 1250° C. or less to obtain a hot-rolled sheet;
coiling the hot-rolled sheet at a temperature of 650° C. or less;

then, performing cold-rolling of the hot-rolled sheet with a reduction ratio of 70% or more to obtain a cold-rolled sheet; and performing continuous annealing of the cold-rolled sheet at a temperature of 750° C. to 900° C., wherein the performing the hot-rolling comprises performing finish-rolling at a temperature of 850° C. to 1000° C. under a state in which two phases of ferrite and austenite exist, a total reduction ratio at last three stands is 60% or more in the finish-rolling, cooling is started within one second from an end of the finish-rolling, and the slab comprises a chemical composition expressed by, in mass %, Si: 0.01% to 0.50%;
Mn or Cr, or both thereof: 0.70% to 1.50% in total;
C: 0.030% to 0.060% when Cr: "0" (zero) % or more and less than 0.30%, 0.030% to 0.080% when Cr: 0.30% or more and 1.50% or less;
Al: 0.800% to 2.000%;
P: 0.030% or less;
S: 0.0100% or less;
Mo: 0.10% to 0.50%;
O: 0.0070% or less;
N: 0.0070% or less;
B: "0" (zero) % to 0.0020%;
Ti: "0" (zero) % to 0.050%;
Nb: "0" (zero) % to 0.050%;
V: "0" (zero) % to 0.050%;
Ni: "0" (zero) % to 1.00%;
Cu: "0" (zero) % to 1.00%;
Ca or REM, or both of them: "0" (zero) % to 0.0300% in total;
W: "0" (zero) % to 1.000%;
Mg: "0" (zero) % to 0.010%;
Zr: "0" (zero) % to 0.200%;
As: "0" (zero) % to 0.500%;
Co: "0" (zero) % to 1.000%;
Sn: "0" (zero) % to 0.200%;
Pb: "0" (zero) % to 0.200%;
Y: "0" (zero) % to 0.200%;
Hf: "0" (zero) % to 0.2000%; and
the balance: Fe and impurities.

9. The method of manufacturing the cold-rolled steel sheet according to claim 8, wherein in the chemical composition satisfies:
Cr: 0.30% to 0.80%; or
Mn: 0.40% to 1.00%; or
both thereof.

10. The method of manufacturing the cold-rolled steel sheet according to claim 8, wherein the chemical composition satisfies:
B: 0.0003% to 0.0020%;
Ti: 0.005% to 0.050%;
Nb: 0.005% to 0.050%; or
V: 0.005% to 0.050%; or
any combination thereof.

11. The method of manufacturing the cold-rolled steel sheet according to claim 8, wherein the chemical composition satisfies:
Ni: 0.01% to 1.00%; or
Cu: 0.01% to 1.00%; or
both thereof.

12. The method of manufacturing the cold-rolled steel sheet according to claim 8, wherein the chemical composition satisfies
Ca or REM, or both thereof: 0.0005% to 0.0300% in total.

13. The method of manufacturing the cold-rolled steel sheet according to claim 8, wherein the chemical composition satisfies:
W: 0.001% to 1.000%;
Mg: 0.0001% to 0.010%;
Zr: 0.0001% to 0.200%;
As: 0.0001% to 0.500%;
Co: 0.0001% to 1.000%;
Sn: 0.0001% to 0.200%;
Pb: 0.0001% to 0.200%;
Y: 0.0001% to 0.200%; or
Hf: 0.0001% to 0.2000%; or
any combination thereof.

14. A method of manufacturing a galvanized cold-rolled steel sheet, comprising:
manufacturing a cold-rolled steel sheet by the method according to claim 8; and
forming a hot-dip galvanized layer or an alloyed hot-dip galvanized layer on a surface of the cold-rolled steel sheet.

* * * * *